United States Patent
Li et al.

(10) Patent No.: US 10,182,436 B2
(45) Date of Patent: Jan. 15, 2019

(54) DATA SENDING METHOD AND APPARATUS

(71) Applicant: HUAWEI TECHNOLOGIES CO., LTD., Shenzhen, Guangdong (CN)

(72) Inventors: Bingzhao Li, Beijing (CN); Zhenxing Hu, Shenzhen (CN); Wei Quan, Beijing (CN); Jian Zhang, Beijing (CN); Jinhua Miao, Beijing (CN); Xiaodong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 15/587,477

(22) Filed: May 5, 2017

(65) Prior Publication Data

US 2017/0245272 A1    Aug. 24, 2017

Related U.S. Application Data

(63) Continuation of application No. PCT/CN2014/090650, filed on Nov. 7, 2014.

(51) Int. Cl.
*H04W 72/04* (2009.01)
*H04W 16/14* (2009.01)

(52) U.S. Cl.
CPC ....... *H04W 72/0446* (2013.01); *H04W 16/14* (2013.01); *H04W 72/04* (2013.01); *H04W 72/042* (2013.01)

(58) Field of Classification Search
CPC ... H04W 16/14; H04W 72/04; H04W 72/042; H04W 72/0446
See application file for complete search history.

(56) References Cited

U.S. PATENT DOCUMENTS

2011/0019541 A1  1/2011  Li et al.
2011/0026622 A1  2/2011  Luo et al.
(Continued)

FOREIGN PATENT DOCUMENTS

CN   101478808 A   7/2009
CN   102498689 A   6/2012
(Continued)

OTHER PUBLICATIONS

International Search Report dated Aug. 6, 2015, in corresponding International Application No. PCT/CN2014/090650.
(Continued)

*Primary Examiner* — Mohamed A Kamara
(74) *Attorney, Agent, or Firm* — Staas & Halsey LLP

(57) ABSTRACT

A data transmission method and an apparatus are provided. The method includes: determining, by a base station, a time-domain interval of available time-frequency resources in an unlicensed spectrum, where the available time-frequency resources are continuous time-frequency resources in a time domain; sending, by the base station, a preamble signal in a first subframe in the interval, where the first subframe is an initial subframe in the interval; and sending, by the base station, downlink control information and data after sending the preamble signal, where the data is in the first subframe, the downlink control information includes scheduling indication information, and the scheduling indication information is used to indicate a frequency-domain location of the data. According to the present invention, spectrum utilization can be improved.

16 Claims, 8 Drawing Sheets

(56) References Cited

U.S. PATENT DOCUMENTS

| | | | |
|---|---|---|---|
| 2013/0143502 A1 | 6/2013 | Kazmi et al. | |
| 2013/0294356 A1 | 11/2013 | Bala et al. | |
| 2014/0029428 A1* | 1/2014 | Lin | H04L 5/0048 370/235 |
| 2014/0112289 A1 | 4/2014 | Kim et al. | |
| 2015/0103715 A1* | 4/2015 | Chen | H04W 76/15 370/311 |
| 2015/0148053 A1* | 5/2015 | Patel | H04W 72/0426 455/452.1 |
| 2016/0066343 A1 | 3/2016 | Lin et al. | |

FOREIGN PATENT DOCUMENTS

| | | |
|---|---|---|
| CN | 103069882 A | 4/2013 |
| CN | 103220690 A | 7/2013 |
| CN | 103780334 A | 5/2014 |
| CN | 104113924 A | 10/2014 |
| WO | 2013006988 A1 | 1/2013 |

OTHER PUBLICATIONS

Qualcomm Incorporated: "Solutions for required functionalities and design targets," 3GPP Draft; R1-144000 Solutions for Required Functionalities and Design Targets, 3$^{rd}$ Generation Partnership Project (3GPP), Mobile Competence Centre, Route Des Lucioles, F-06921, vol. RAN WG1, No. Ljubljana, Slovenia; Oct. 5, 2014, XP050875301.

Rapeepat Ratasuk et al.: "License-exempt LTE Deployment in Heterogeneous Network," Wireless Communication Systems (ISWCS), 2012 International Symposium On, IEEE, Aug. 28, 2012, pp. 246-250, XP032263759.

Extended European Search Report dated Oct. 5, 2017 in corresponding European Patent Application No. 14905658.2.

Office Action, dated Oct. 8, 2018, in Chinese Application No. 201480009842.1 (8 pp.).

* cited by examiner

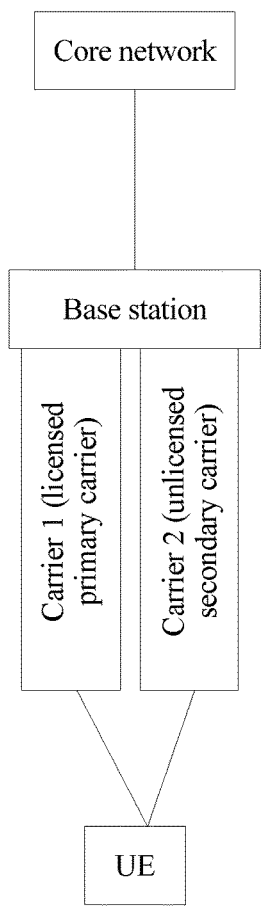 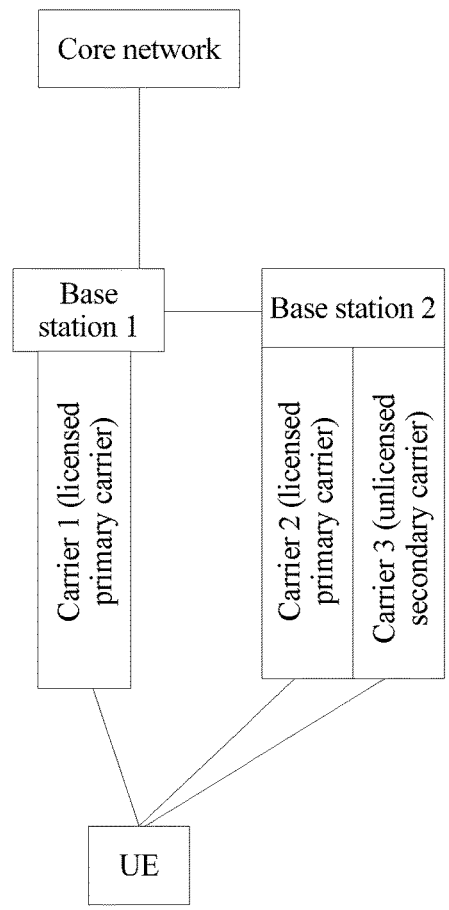 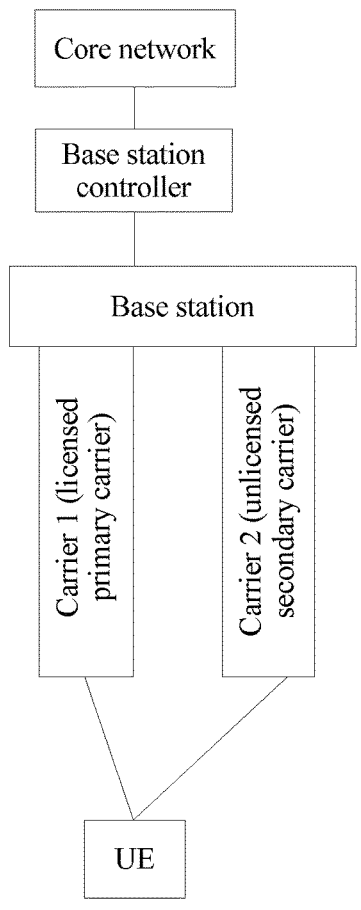
FIG. 2(a)   FIG. 2 (b)   FIG. 2 (c)

DATA SENDING METHOD AND APPARATUS

CROSS-REFERENCE TO RELATED APPLICATIONS

This application is a continuation of International Application No. PCT/CN2014/090650, filed on Nov. 7, 2014, the disclosure of which is hereby incorporated by reference in its entirety.

TECHNICAL FIELD

Embodiments of the present invention relate to a communications system, and in particular, to a data sending method and an apparatus.

BACKGROUND

A spectrum in which a serving cell of a Long Term Evolution (LTE) system is located is a licensed spectrum, and can be used by only an operator network with the purchased licensed spectrum. At present, the industry increasingly concerns an unlicensed spectrum. Carrier aggregation is performed on an unlicensed spectrum that is used as a secondary carrier and a licensed spectrum that is used as a primary carrier, to serve user equipment (UE). This is the most concerned method for using an unlicensed spectrum at present. The secondary carrier corresponding to the unlicensed spectrum may be referred to as an unlicensed secondary carrier, and the primary carrier corresponding to the licensed spectrum may be referred to as a licensed primary carrier.

The unlicensed spectrum may be used as the secondary carrier to transmit data for UE. However, the unlicensed spectrum may be discontinuous. A base station can only use the unlicensed spectrum for a specific time period after obtaining a resource of the unlicensed spectrum by means of contending. After another base station occupies the unlicensed spectrum by means of contending, when the another base station occupies the unlicensed spectrum, the base station cannot send a signal by using the unlicensed spectrum. The base station cannot send a signal to UE by exclusively using the unlicensed spectrum. Therefore, the unlicensed spectrum can be used only as a secondary carrier to provide a service for user equipment. The unlicensed spectrum needs to be anchored to a licensed spectrum for using. For example, the unlicensed secondary carrier needs to be anchored to a licensed primary carrier for using. In this case, the primary carrier and the secondary carrier need to have a same timing relationship, a same subframe number, and a same subframe boundary.

The unlicensed spectrum refers to a public spectrum that any organization or person can use. However, a specific rule needs to be followed in use, for example, listen before talk (LBT). That is, only when it is determined, by means of listening, that the spectrum is idle, a signal can be sent on the unlicensed spectrum. Generally, clear channel assessment (CCA) or extended CCA (ECCA) is used in LBT. A channel is listened for at least 20 μs for a base station in CCA. If a signal is not obtained by means of listening, the channel is considered to be idle and can be used. If the base station finds, after performing listening for 20 μs, that the channel is occupied, CCA is switched to ECCA. A random number R is generated for the base station in ECCA, and the channel is listened in continuous R time periods. If the channel is all in an idle state in the R time periods, the channel can be used. An end time of CCA or ECCA may be a symbol at the middle of a subframe of the unlicensed spectrum. Therefore, data cannot be transmitted at subsequent several symbols. This causes a waste of spectrum resources.

SUMMARY

Embodiments of the present invention provide a data sending method and an apparatus, so as to improve spectrum utilization.

According to a first aspect, a data sending method is provided, including: determining, by a base station, a time-domain interval of available time-frequency resources in an unlicensed spectrum, where the available time-frequency resources are continuous time-frequency resources in a time domain; sending, by the base station, a preamble signal in a first subframe in the interval, where the first subframe is an initial subframe in the interval; and sending, by the base station, downlink control information and data after sending the preamble signal, where the data is in the first subframe, the downlink control information includes scheduling indication information, and the scheduling indication information is used to indicate a frequency-domain location of the data.

In a first possible implementation manner, the downlink control information is in a downlink control channel, and the first subframe includes N symbols in the time domain, where the downlink control channel is located in n symbols following the preamble signal; or the downlink control channel is located in last n symbols of the first subframe; or the downlink control channel is an enhanced physical downlink control channel, the enhanced physical downlink control channel is located in the subframe in which the preamble signal is located, and the enhanced physical downlink control channel is located in a symbol after the preamble signal; where $0<n<N$, and both n and N are natural numbers.

With reference to the first possible implementation manner, in a second possible implementation manner, when the downlink control channel is located in the n symbols following the preamble signal, the data is in a symbol after the downlink control channel; when the downlink control channel is located in the last n symbols of the first subframe, the data is in a symbol between the preamble signal and the downlink control channel; or when the downlink control channel is the enhanced physical downlink control channel, the data is in a symbol after the preamble signal.

With reference to the first possible implementation manner, in a third possible implementation manner, the downlink control information further includes location indication information, and the location indication information is used to indicate a start symbol m of the data in the first subframe in the time domain, where when the downlink control channel is located in the n symbols following the preamble signal, the data is between the symbol m and a last symbol of the first subframe; or when the downlink control channel is located in the last n symbols of the subframe in which the preamble signal is located, the data is between the symbol m and a symbol before the downlink control channel.

With reference to the first to the third possible implementation manners, in a fourth possible implementation manner, the preamble signal is in at least one symbol at the beginning of the interval.

With reference to any one of the first aspect or the first to the fourth possible implementation manners, in a fifth possible implementation manner, the downlink control information further includes duration indication information, and the duration indication information is used to indicate available duration of the base station in the unlicensed spectrum.

With reference to the fifth possible implementation manner, in a sixth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to any one of the first aspect or the first to the sixth possible implementation manners, in a seventh possible implementation manner, the preamble signal is used to indicate the available duration in the unlicensed spectrum, and the available duration is a length of the time-domain interval of the available time-frequency resources.

With reference to the seventh possible implementation manner, in an eighth possible implementation manner, at least two different preamble signals indicate different duration.

With reference to any one of the sixth to the eighth possible implementation manners, in a ninth possible implementation manner, the method further includes: sending, by the base station in n symbols at the beginning of a second subframe, the downlink control channel on which the first subframe is scheduled, where the second subframe is in the duration and is after the first subframe.

With reference to any one of the first aspect or the first to the ninth possible implementation manners, in a tenth possible implementation manner, the preamble signal occupies fixed duration in the time domain.

With reference to any one of the first aspect or the first to the tenth possible implementation manners, in an eleventh possible implementation manner, the preamble signal is a sequence in at least one preset sequence.

According to a second aspect, a base station is provided, including: a processing unit, configured to determine a time-domain interval of available time-frequency resources in an unlicensed spectrum, where the available time-frequency resources are continuous time-frequency resources in a time domain; and a sending unit, configured to send a preamble signal in a first subframe in the interval, where the first subframe is an initial subframe in the interval, where the sending unit is further configured to send downlink control information and data after sending the preamble signal, where the data is in the first subframe, the downlink control information includes scheduling indication information, and the scheduling indication information is used to indicate a frequency-domain location of the data.

In a first possible implementation manner, the downlink control information is in a downlink control channel, and the first subframe includes N symbols in the time domain, where the downlink control channel is located in n symbols following the preamble signal; or the downlink control channel is located in last n symbols of the first subframe; or the downlink control channel is an enhanced physical downlink control channel, the enhanced physical downlink control channel is located in the subframe in which the preamble signal is located, and the enhanced physical downlink control channel is located in a symbol after the preamble signal; where 0<n<N, and both n and N are natural numbers.

With reference to the first possible implementation manner, in a second possible implementation manner, when the downlink control channel is located in the n symbols following the preamble signal, the data is in a symbol after the downlink control channel; when the downlink control channel is located in the last n symbols of the first subframe, the data is in a symbol between the preamble signal and the downlink control channel; or when the downlink control channel is the enhanced physical downlink control channel, the data is in a symbol after the preamble signal.

With reference to the first possible implementation manner, in a third possible implementation manner, the downlink control information further includes location indication information, and the location indication information is used to indicate a start symbol m of the data in the first subframe in the time domain, where when the downlink control channel is located in the n symbols following the preamble signal, the data is between the symbol m and a last symbol of the first subframe; or when the downlink control channel is located in the last n symbols of the subframe in which the preamble signal is located, the data is between the symbol m and a symbol before the downlink control channel.

With reference to the first to the third possible implementation manners, in a fourth possible implementation manner, the preamble signal is in at least one symbol at the beginning of the interval.

With reference to any one of the second aspect or the first to the fourth possible implementation manners, in a fifth possible implementation manner, the downlink control information further includes duration indication information, and the duration indication information is used to indicate available duration of the base station in the unlicensed spectrum.

With reference to the fifth possible implementation manner, in a sixth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to any one of the second aspect or the first to the sixth possible implementation manners, in a seventh possible implementation manner, the preamble signal is used to indicate the available duration of the base station in the unlicensed spectrum, and at least two different preamble signals are corresponding to different duration.

With reference to the seventh possible implementation manner, in an eighth possible implementation manner, at least two different preamble signals indicate different duration.

With reference to any one of the sixth to the eighth possible implementation manners, in a ninth possible implementation manner, the sending unit is further configured to send, in n symbols at the beginning of a second subframe, the downlink control channel on which the first subframe is scheduled, where the second subframe is in the duration and is after the first subframe.

With reference to any one of the second aspect or the first to the ninth possible implementation manners, in a tenth possible implementation manner, the preamble signal occupies fixed duration in the time domain.

With reference to any one of the second aspect or the first to the tenth possible implementation manners, in an eleventh possible implementation manner, the preamble signal sent by the sending unit is a sequence in at least one preset sequence.

According to a third aspect, a data sending method is provided, including: determining, by a base station, a time-domain interval of available time-frequency resources in an unlicensed spectrum, where the available time-frequency resources are continuous time-frequency resources in a time domain; and sending, by the base station, downlink control information and data, where the data is in a first subframe, the first subframe is an initial subframe in the interval, the downlink control information is in a downlink control channel, the downlink control information includes scheduling indication information and location indication information, the scheduling indication information is used to indicate a frequency-domain location of the data, and the location indication information is used to indicate a time-domain location of the data.

In a first possible implementation manner, the first subframe includes N symbols in the time domain, where the downlink control channel is located in n symbols at the beginning of a second subframe, and the location indication information is further used to indicate that the first subframe is a subframe before the second subframe; or the downlink control channel is located in last n symbols of the first subframe; where $0<n<N$, and both n and N are natural numbers.

With reference to the first possible implementation manner, in a second possible implementation manner, the location indication information is used to indicate a start symbol m of the data in the first subframe in the time domain, and when the downlink control channel is located in the n symbols at the beginning of the second subframe, the data in the first subframe is between the symbol m and a last symbol of the first subframe; or when the downlink control channel is located in the last n symbols of the first subframe, the data in the first subframe is after the symbol m and is before the downlink control channel.

With reference to any one of the third aspect, the first possible implementation manner, or the second possible implementation manner, in a third possible implementation manner, the downlink control information further includes duration indication information, and the duration indication information is used to indicate available duration of the base station in the unlicensed spectrum.

With reference to the third possible implementation manner, in a fourth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to the third possible implementation manner or the fourth possible implementation manner, in a fifth possible implementation manner, the method further includes: sending, by the base station in the n symbols at the beginning of the second subframe, the downlink control channel on which the first subframe is scheduled, where the second subframe is in the duration and is after the first subframe.

According to a fourth aspect, a base station is provided, including: a processing unit, configured to determine a time-domain interval of available time-frequency resources in an unlicensed spectrum, where the available time-frequency resources are continuous time-frequency resources in a time domain; and a sending unit, configured to send downlink control information and data, where the data is in a first subframe, the first subframe is an initial subframe in the interval, the downlink control information is in a downlink control channel, the downlink control information includes scheduling indication information and location indication information, the scheduling indication information is used to indicate a frequency-domain location of the data, and the location indication information is used to indicate a time-domain location of the data.

In a first possible implementation manner, the first subframe includes N symbols in the time domain, where the downlink control channel is located in n symbols at the beginning of a second subframe, and the location indication information is further used to indicate that the first subframe is a subframe before the second subframe; or the downlink control channel is located in last n symbols of the first subframe; where $0<n<N$, and both n and N are natural numbers.

With reference to the first possible implementation manner, in a second possible implementation manner, the location indication information is used to indicate a start symbol m of the data in the first subframe in the time domain, and when the downlink control channel is located in the n symbols at the beginning of the second subframe, the data in the first subframe is between the symbol m and a last symbol of the first subframe; or when the downlink control channel is located in the last n symbols of the first subframe, the data in the first subframe is after the symbol m and is before the downlink control channel.

With reference to any one of the fourth aspect, the first possible implementation manner, or the second possible implementation manner, in a third possible implementation manner, the downlink control information further includes duration indication information, and the duration indication information is used to indicate available duration of the base station in the unlicensed spectrum.

With reference to the third possible implementation manner, in a fourth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to the third or the fourth possible implementation manner, in a fifth possible implementation manner, the sending unit is further configured to send, in the n symbols at the beginning of the second subframe, the downlink control channel on which the first subframe is scheduled, where the second subframe is in the duration and is after the first subframe.

According to a fifth aspect, a data receiving method is provided, including: performing, by user equipment, detection on a downlink control channel to obtain downlink control information, where the downlink control information includes scheduling indication information, and the scheduling indication information is used to indicate a frequency-domain location of scheduled data in a first subframe; determining, by the user equipment, a time-domain location of the data in the first subframe according to location indication information in the downlink control channel or a preamble signal received in an unlicensed spectrum before the downlink control channel, where the location indication information is used to indicate the time-domain location of the data in the first subframe; and receiving, by the user equipment, the data in the unlicensed spectrum according to the frequency-domain location and the time-domain location of the data.

In a first possible implementation manner, before the performing, by user equipment, detection on a downlink control channel to obtain downlink control information, the method further includes: receiving, by the user equipment, the preamble signal in the unlicensed spectrum, where the preamble signal is a sequence in at least one preset sequence.

With reference to the first possible implementation manner, in a second possible implementation manner, before the performing, by user equipment, detection on a downlink control channel to obtain downlink control information, the method further includes: after receiving the preamble signal, determining, by the user equipment, a location of the downlink control channel in the unlicensed spectrum according to the preamble signal.

With reference to the second possible implementation manner, in a third possible implementation manner, the subframe includes N symbols in the time domain, and the downlink control channel is located in n symbols following the preamble signal; or the downlink control channel is located in last n symbols of a subframe in which the preamble signal is located; or the downlink control channel is an enhanced physical downlink control channel, the enhanced physical downlink control channel is located in a subframe in which the preamble signal is located, and the enhanced physical downlink control channel is located in a symbol after the preamble signal; where the first subframe is the subframe in which the preamble signal is located, $0<n<N$, and both n and N are natural numbers.

With reference to the third possible implementation manner, in a fourth possible implementation manner, the determining, by the user equipment, a time-domain location of the data in the first subframe according to a preamble signal received before the downlink control channel includes: determining, by the user equipment, a symbol in which the preamble signal is located; and determining, by the user equipment according to the symbol in which the preamble signal is located and a symbol in which the downlink control channel is located, a symbol in which the data in the first subframe is located.

With reference to the third possible implementation manner, in a fifth possible implementation manner, the location indication information is used to indicate a start symbol m of the data in the first subframe in the time domain, and the determining, by the user equipment, a time-domain location of the data in the first subframe according to location indication information in the downlink control channel includes: when the downlink control channel is located in the n symbols following the preamble signal, determining, by the user equipment, that the data in the first subframe is between the symbol m and a last symbol of the first subframe; or when the downlink control channel is located in the last n symbols of the subframe in which the preamble signal is located, determining, by the user equipment, that the data in the first subframe is between the symbol m and a symbol before the downlink control channel.

In a sixth possible implementation manner, the downlink control channel is located in last n symbols of a detected subframe, and the first subframe is a subframe in which the downlink control channel is located.

In a seventh possible implementation manner, the performing, by user equipment, detection on a downlink control channel to obtain downlink control information includes: performing, by the user equipment, detection on a first downlink control channel and a second downlink control channel, where the first downlink control channel is located in n symbols at the beginning of a detected subframe, and the second downlink control channel is located in last n symbols of the detected subframe, and if the downlink control information is obtained in the second downlink control channel, the downlink control information includes the scheduling indication information, and the first subframe is a subframe in which the downlink control channel is located.

With reference to the sixth or the seventh possible implementation manner, in an eighth possible implementation manner, the location indication information is used to indicate a start symbol m of the data in the first subframe in the time domain, and the determining, by the user equipment, a time-domain location of the data in the first subframe according to location indication information in the downlink control channel includes: determining, by the user equipment, that the data in the first subframe is between the symbol m and a symbol before the downlink control channel.

In a ninth possible implementation manner, the performing, by user equipment, detection on a downlink control channel to obtain downlink control information includes: performing, by the user equipment, detection on the downlink control channel to obtain the downlink control information, where the downlink control channel is located in n symbols at the beginning of a detected subframe; and when the downlink control information includes the location indication information, determining, by the user equipment, that the first subframe is a subframe before a subframe in which the downlink control channel is located.

With reference to the ninth possible implementation manner, in a tenth possible implementation manner, the location indication information is used to indicate a start symbol m of the data in the first subframe in the time domain, and the determining, by the user equipment, a time-domain location of the data in the first subframe according to location indication information in the downlink control channel includes: determining, by the user equipment, that the data in the first subframe is between the symbol m and a last symbol of the first subframe.

With reference to any one of the fifth aspect or the first to the tenth possible implementation manners, in an eleventh possible implementation manner, the downlink control information further includes duration indication information, and the duration indication information is used to indicate available duration of a base station in the unlicensed spectrum.

With reference to the eleventh possible implementation manner, in a twelfth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to any one of the fifth aspect or the first to the fifth possible implementation manners, in a thirteenth possible implementation manner, the preamble signal is used to indicate available duration of a base station in the unlicensed spectrum, and at least two different preamble signals are corresponding to different duration.

With reference to any one of the eleventh to the thirteenth possible implementation manners, in a fourteenth possible implementation manner, the method further includes: performing, by the user equipment in n symbols at the beginning of a second subframe, detection on the downlink control channel on which the second subframe is scheduled, where the second subframe is in the duration and is after the first subframe.

With reference to any one of the fifth aspect or the first to the fourteenth possible implementation manners, in a fifteenth possible implementation manner, the preamble signal occupies fixed duration in the time domain.

According to a sixth aspect, user equipment is provided, including: a processing unit, configured to perform detection on a downlink control channel to obtain downlink control information, where the downlink control information includes scheduling indication information, and the scheduling indication information is used to indicate a frequency-domain location of scheduled data in a first subframe, where the processing unit is further configured to determine a time-domain location of the data in the first subframe according to location indication information in the downlink control channel or a preamble signal received in an unlicensed spectrum before the downlink control channel, where the location indication information is used to indicate the time-domain location of the data in the first subframe; and a receiving unit, configured to receive the data in the unlicensed spectrum according to the frequency-domain location and the time-domain location of the data.

In a first possible implementation manner, before the processing unit performs detection on the downlink control channel to obtain the downlink control information, the receiving unit further includes: receive the preamble signal in the unlicensed spectrum, where the preamble signal is a sequence in at least one preset sequence.

With reference to the first possible implementation manner, in a second possible implementation manner, before the processing unit performs detection on the downlink control channel to obtain the downlink control information, the processing unit further includes: after receiving the preamble signal, determine, by the processing unit, a location of the downlink control channel in the unlicensed spectrum according to the preamble signal.

With reference to the second possible implementation manner, in a third possible implementation manner, the subframe includes N symbols in the time domain, and the downlink control channel is located in n symbols following the preamble signal; or the downlink control channel is located in last n symbols of a subframe in which the preamble signal is located; or the downlink control channel is an enhanced physical downlink control channel, the enhanced physical downlink control channel is located in a subframe in which the preamble signal is located, and the enhanced physical downlink control channel is located in a symbol after the preamble signal; where the first subframe is the subframe in which the preamble signal is located, $0<n<N$, and both n and N are natural numbers.

With reference to the third possible implementation manner, in a fourth possible implementation manner, that the processing unit determines the time-domain location of the data in the first subframe according to the preamble signal received before the downlink control channel includes: the processing unit determines a symbol in which the preamble signal is located; and the processing unit determines, according to the symbol in which the preamble signal is located and a symbol in which the downlink control channel is located, a symbol in which the data in the first subframe is located.

With reference to the third possible implementation manner, in a fifth possible implementation manner, the location indication information is used to indicate a start symbol m of the data in the first subframe in the time domain, and that the processing unit determines the time-domain location of the data in the first subframe according to the location indication information in the downlink control channel includes: when the downlink control channel is located in the n symbols following the preamble signal, the processing unit determines that the data in the first subframe is between the symbol m and a last symbol of the first subframe; or when the downlink control channel is located in the last n symbols of the subframe in which the preamble signal is located, the processing unit determines that the data in the first subframe is between the symbol m and a symbol before the downlink control channel.

In a sixth possible implementation manner, the downlink control channel is located in last n symbols of a detected subframe, and the first subframe is a subframe in which the downlink control channel is located.

In a seventh possible implementation manner, that the processing unit performs detection on the downlink control channel to obtain the downlink control information includes: the processing unit performs detection on a first downlink control channel and a second downlink control channel, where the first downlink control channel is located in n symbols at the beginning of a detected subframe, and the second downlink control channel is located in last n symbols of the detected subframe, and if the downlink control information is obtained in the second downlink control channel, the downlink control information includes the scheduling indication information, and the first subframe is a subframe in which the downlink control channel is located.

With reference to the sixth or the seventh possible implementation manner, in an eighth possible implementation manner, the location indication information is used to indicate a start symbol m of the data in the first subframe in the time domain, and that the processing unit determines the time-domain location of the data in the first subframe according to the location indication information in the downlink control channel includes: the processing unit determines that the data in the first subframe is between the symbol m and a symbol before the downlink control channel.

In a ninth possible implementation manner, that the processing unit performs detection on the downlink control channel to obtain the downlink control information includes: the processing unit performs detection on the downlink control channel to obtain the downlink control information, where the downlink control channel is located in n symbols at the beginning of a detected subframe; and when the downlink control information includes the location indication information, the processing unit determines that the first subframe is a subframe before a subframe in which the downlink control channel is located.

With reference to the ninth possible implementation manner, in a tenth possible implementation manner, the location indication information is used to indicate a start symbol m of the data in the first subframe in the time domain, and that the processing unit determines the time-domain location of the data in the first subframe according to the location indication information in the downlink control channel includes: the processing unit determines that the data in the first subframe is between the symbol m and a last symbol of the first subframe.

With reference to any one of the sixth aspect or the first to the tenth possible implementation manners, in an eleventh possible implementation manner, the downlink control information further includes duration indication information, and the duration indication information is used to indicate available duration of a base station in the unlicensed spectrum.

With reference to the eleventh possible implementation manner, in a twelfth possible implementation manner, the downlink control information includes first downlink control information and second downlink control information, the scheduling indication information is in the first downlink control information, the duration indication information is in the second downlink control information, the first downlink control information is in a user-specific search interval, and the second downlink control information is in a public search interval.

With reference to any one of the sixth aspect or the first to the fifth possible implementation manners, in a thirteenth possible implementation manner, the preamble signal is used to indicate available duration of a base station in the unlicensed spectrum, and at least two different preamble signals are corresponding to different duration.

With reference to any one of the eleventh to the thirteenth possible implementation manners, in a fourteenth possible implementation manner, the user equipment further includes: perform, by the processing unit in n symbols at the beginning of a second subframe, detection on the downlink control channel on which the second subframe is scheduled, where the second subframe is in the duration and is after the first subframe.

With reference to any one of the sixth aspect or the first to the fourteenth possible implementation manners, in a fifteenth possible implementation manner, the preamble signal occupies fixed duration in the time domain.

In the prior art, a base station sends only a preamble after determining a time-domain interval of available time-frequency resources in an unlicensed spectrum. The preamble in the prior art is used to only occupy a channel, and user equipment cannot receive data or scheduling information when the preamble occupies the channel. However, in the embodiments of the present invention, after a base station determines a time-domain interval of available time-frequency resources in an unlicensed spectrum, the base station sends a preamble signal in a first subframe in the interval, and then sends downlink control information and data; or the base station sends downlink control information and data in a first subframe in the interval. The data is in the first subframe. Therefore, at least the data is sent in the first subframe, so as to improve spectrum utilization resource.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2(a) and FIG. 2(b) and FIG. 2c) are a diagram of a system according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions of this application may be applied to various communications systems such as a Code Division Multiple Access (CDMA) system, a Wideband Code Division Multiple Access (WCDMA) system, a general packet radio service (GPRS), an LTE system, a Long Term Evolution Advanced (LTE-A) system, and a Universal Mobile Telecommunications System (UMTS). This is not limited in embodiments of this application. However, for ease of description, the embodiments of this application are described by using an LTE system as an example.

Figure 1:
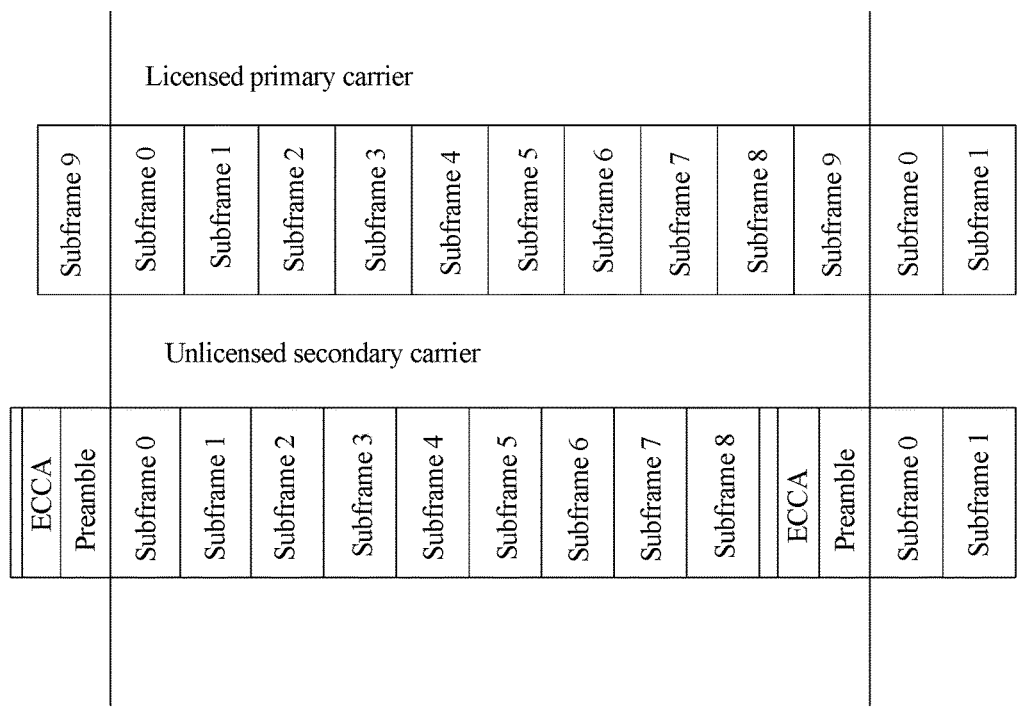
FIG. 1 is a structural diagram of subframes of an unlicensed carrier according to an embodiment of the present invention.

FIG. 1 is a structural diagram of subframes of an unlicensed carrier. FIG. 1 shows a licensed primary carrier and an unlicensed secondary carrier. Frame numbers corresponding to the licensed primary carrier are the same as frame numbers corresponding to the unlicensed secondary carrier, and frame boundaries corresponding to the licensed primary carrier are aligned with frame boundaries corresponding to the unlicensed secondary carrier. After an ECCA process is performed on the unlicensed secondary carrier (certainly, or after a CCA process is performed, where FIG. 1 is described by using ECCA as an example), data is transmitted by using the unlicensed secondary carrier. Because an end location of ECCA performed by a base station on an unlicensed spectrum does not coincide with a subframe boundary, a time period from the end of the ECCA process to a subframe 0 is an incomplete subframe, and data cannot be transmitted. In the prior art, sending a preamble in this stage is proposed. The preamble is used to keep the base station occupying a channel resource on which the unlicensed secondary carrier is located. Specifically, in a preamble sending stage, the base station cannot send scheduling information or data specific to a user. Therefore, user equipment cannot receive data or scheduling information when the preamble occupies the unlicensed secondary carrier. Therefore, scheduling information or data information cannot be sent in a subframe in which ECCA is located. This causes a waste of an unlicensed spectrum resource.

FIG. 2(a) and FIG. 2(b) and FIG. 2c) are a schematic diagram of a system according to an embodiment of the present invention. The system applied in this embodiment of the present invention includes a base station and UE.

The base station provided in this embodiment of the present invention may be a NodeB (NB) in UMTS or an evolved NodeB (eNodeB, eNB) in LTE. The base station communicates with the UE, receives data from the UE, and sends the data to a base station controller or a core network device, or sends the data to a corresponding primary base station, and then the primary base station sends the data to a base station controller or a core network device.

The UE provided in this embodiment of the present invention may be but is not limited to a mobile station (MS), a mobile terminal, a mobile telephone, a handset, a portable device, or the like.

For example, as shown in FIG. 2(a), the base station communicates with the UE by using a licensed primary carrier 1 and an unlicensed secondary carrier 2, and the base station sends data to a core network. As shown in FIG. 2(b), a base station 1 communicates with the UE by using a licensed primary carrier 1, and a base station 2 communicates with the UE by using a licensed primary carrier 2 and an unlicensed secondary carrier 3. The base station 2 communicates with the base station 1. The base station 1 is a primary base station. Therefore, the base station 1 sends data to a core network. As shown in FIG. 2(c), the base station communicates with the UE by using a licensed primary carrier 1 and an unlicensed secondary carrier 2, and the base station sends data to a core network by using a base station controller.

The embodiments of the present invention are based on the foregoing system architecture. It should be noted that the embodiments and characteristics in the embodiments may be combined with each other if there is no conflict.

Figure 3:
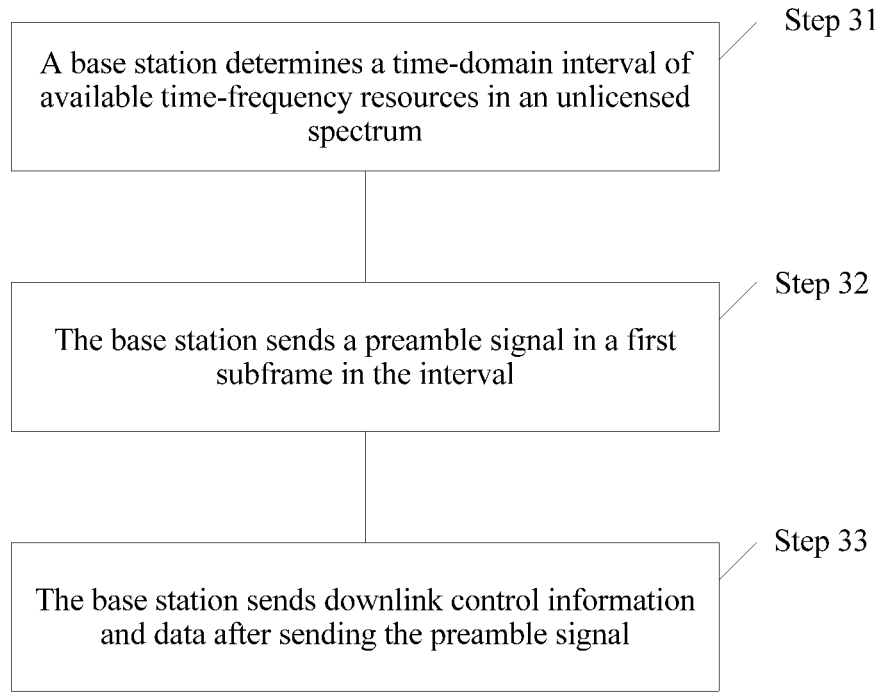
FIG. 3 shows a data sending method according to an embodiment of the present invention.

FIG. 3 shows a data sending method according to an embodiment of the present invention, and the method includes the following steps:

Step 31: A base station determines a time-domain interval of available time-frequency resources in an unlicensed spectrum. The available time-frequency resources are continuous time-frequency resources in a time domain.

Step 32: The base station sends a preamble signal in a first subframe in the interval. The first subframe is an initial subframe in the interval.

Step 33: The base station sends downlink control information and data after sending the preamble signal.

The data is in the first subframe. The downlink control information includes scheduling indication information. The scheduling indication information is used to indicate a frequency-domain location of the data.

In the prior art, a base station sends only a preamble after determining a time-domain interval of available time-frequency resources in an unlicensed spectrum. The preamble in the prior art is used to only occupy a channel. Therefore, another base station cannot occupy the channel. However, user equipment cannot receive data or scheduling information when the preamble occupies the channel. However, in this embodiment of the present invention, after the base station determines the time-domain interval of the available time-frequency resources in the unlicensed spectrum, the base station sends the preamble signal in the first subframe in the interval, and then sends the downlink control information and the data. The data is in the first subframe. Therefore, at least the data is sent in the first subframe, so as to avoid a waste of this spectrum resource, and improve spectrum utilization resource.

In an optional embodiment, the preamble signal is a sequence in at least one preset sequence.

In an optional embodiment, that a base station determines a time-domain interval of available time-frequency resources in an unlicensed spectrum includes: the base station may first determine, by means of listening, whether a signal is being sent on a wireless channel on which the first carrier is located, and if there is no another device using the wireless channel, the base station determines that a signal may be sent by using the first carrier. Optionally, a processing period may be required for the base station to prepare a to-be-sent signal. In order to prevent the channel being occupied by another device in the processing period, the base station may transmit specific content with specific power on the channel in the period. In this case, it is determined that the time-domain interval of the available time-frequency resources in the unlicensed spectrum starts after the specific content is transmitted.

Optionally, the preamble signal may be specifically a predefined sequence. The base station sends the preamble signal by using the predefined sequence, and the user equipment performs detection on the preamble signal according to the predefined sequence. The predefined preamble sequence may be preset in the user equipment or may be received from the base station by using a message. Optionally, a specific mapping relationship may exist between the preamble sequence and the unlicensed spectrum, so that the user equipment determines, according to the sequence, a signal including the preamble signal as a signal of a serving cell corresponding to the unlicensed secondary carrier.

Optionally, the first subframe includes N symbols in the time domain. The downlink control channel is located in n symbols following the preamble signal.

When the downlink control channel is located in the n symbols following the preamble signal, the data is in a symbol after the downlink control channel.

Optionally, the downlink control channel is located in last n symbols of the subframe in which the preamble signal is located.

When the downlink control channel is located in the last n symbols of the subframe in which the preamble signal is located, the data is in a symbol between the preamble signal and the downlink control channel.

Optionally, the downlink control channel is an enhanced physical downlink control channel (EPDCCH). The enhanced physical downlink control channel is located in the subframe in which the preamble signal is located, and the enhanced physical downlink control channel is located in a symbol after the preamble signal, where 0<n<N, and both n and N are natural numbers.

When the downlink control channel is the enhanced physical downlink control channel, the data is in a symbol after the preamble signal.

In an optional embodiment, the downlink control information further includes location indication information, and the location indication information is used to indicate a start symbol m of the data in the first subframe in the time domain.

Optionally, when the downlink control channel is located in the n symbols following the preamble signal, the data is between the symbol m and a last symbol of the first subframe.

Optionally, when the downlink control channel is located in the last n symbols of the subframe in which the preamble signal is located, the data is between the symbol m and a symbol before the downlink control channel.

The foregoing m is a natural number.

In an optional embodiment, the preamble signal is in at least one symbol at the beginning of the interval.

In an optional embodiment, the downlink control information further includes duration indication information, and the duration indication information is used to indicate available duration of the base station in the unlicensed spectrum.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the downlink control information or the preamble message further includes at least one of a cell identifier of the unlicensed spectrum, a public land mobile network identifier of the unlicensed spectrum, or a quantity of symbols occupied by the downlink control information.

In an optional embodiment, the preamble signal is used to indicate the available duration of the base station in the unlicensed spectrum, and at least two different preamble signals are corresponding to different duration.

In an optional embodiment, the base station sends, in n symbols at the beginning of a second subframe, the downlink control channel on which the first subframe is scheduled. The second subframe is in the interval and is after the first subframe. In an optional embodiment, the downlink control information further includes a forward scheduling indication. Optionally, the forward scheduling indication may be included in the scheduling indication information. The forward scheduling indication is used by the user equipment to determine the downlink control information according to the forward scheduling indication, and is used to schedule data in a subframe before a subframe in which the downlink control information is located.

In an optional embodiment, the base station sends, in n symbols at the beginning of a third subframe, a downlink control channel on which the third subframe is scheduled. The third subframe is in the interval. The downlink control information further includes data symbol indication information, so that the user equipment determines an end location of the data in the third subframe according to the symbol indication information. In an optional embodiment, the third subframe is a last subframe in the interval.

In an optional embodiment, the preamble signal occupies fixed duration in the time domain.

In an optional embodiment, the downlink control information or the preamble signal further includes a radio network temporary identifier RNTI. The RNTI is used by the user equipment to receive the downlink control information according to the RNTI. Optionally, the downlink control information may further include at least one of duration of sending the first signal, a cell identifier of the first carrier, a public land mobile network identifier of the first carrier, or a quantity of symbols occupied by the downlink control information.

Figure 4:
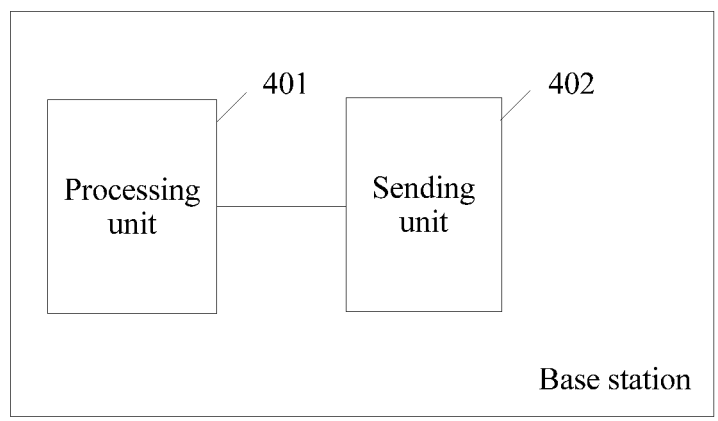
FIG. 4 shows a base station according to an embodiment of the present invention.

FIG. 4 shows a base station according to an embodiment of the present invention. The base station may be configured to execute the data sending method provided in the embodiment shown in FIG. 3. The base station includes a processing unit 401 and a sending unit 402.

The processing unit 401 is configured to determine a time-domain interval of available time-frequency resources in an unlicensed spectrum. The available time-frequency resources are continuous time-frequency resources in a time domain.

The sending unit 402 is configured to send a preamble signal in a first subframe in the interval. The first subframe is an initial subframe in the interval.

The sending unit 402 is further configured to send downlink control information and data after sending the preamble signal. The data is in the first subframe. The downlink control information includes scheduling indication information, and the scheduling indication information is used to indicate a frequency-domain location of the data.

In the prior art, a base station sends only a preamble after determining a time-domain interval of available time-frequency resources in an unlicensed spectrum. The preamble in the prior art is used to only occupy a channel, and user equipment cannot receive data or scheduling information when the preamble occupies the channel. However, in this embodiment of the present invention, after the base station determines the time-domain interval of the available time-frequency resources in the unlicensed spectrum, the base station sends the preamble signal in the first subframe in the interval, and then sends the downlink control information and the data. The data is in the first subframe. Therefore, at least the data is sent in the first subframe, so as to improve spectrum utilization resource.

In an optional embodiment, the preamble signal sent by the sending unit is a sequence in at least one preset sequence.

Optionally, the preamble signal may be specifically a predefined sequence. The base station sends the preamble signal by using the predefined sequence. The user equipment performs detection on the preamble signal according to the predefined sequence. The predefined preamble sequence may be preset in the user equipment or may be received from the base station by using a message. Optionally, a specific mapping relationship may exist between the preamble sequence and the unlicensed spectrum, so that the user equipment determines, according to the sequence, a signal including the preamble signal as a signal of a serving cell corresponding to the unlicensed secondary carrier.

In an optional embodiment, the downlink control information is in a downlink control channel, and the first subframe includes N symbols in the time domain. The downlink control channel is located in n symbols following the preamble signal, or the downlink control channel is located in last n symbols of the first subframe, or the downlink control channel is an enhanced physical downlink control channel, the enhanced physical downlink control channel is located in the subframe in which the preamble signal is located, and the enhanced physical downlink control channel is located in a symbol after the preamble signal, where 0<n<N, and both n and N are natural numbers.

In an optional embodiment, when the downlink control channel is located in the n symbols following the preamble signal, the data is in a symbol after the downlink control channel. When the downlink control channel is located in the last n symbols of the subframe in which the preamble signal is located, the data is in a symbol between the preamble signal and the downlink control channel; or when the downlink control channel is the enhanced physical downlink control channel, the data is in a symbol after the preamble signal.

In an optional embodiment, the downlink control information further includes location indication information, and the location indication information is used to indicate a start symbol m of the data in the first subframe in the time domain. When the downlink control channel is located in the n symbols following the preamble signal, the data is between the symbol m and a last symbol of the first subframe. Alternatively, when the downlink control channel is located in the last n symbols of the subframe in which the preamble signal is located, the data is between the symbol m and a symbol before the downlink control channel. Optionally, m is a natural number.

In an optional embodiment, the preamble signal is in at least one symbol at the beginning of the interval.

In an optional embodiment, the downlink control information further includes duration indication information, and the duration indication information is used to indicate available duration of the base station in the unlicensed spectrum.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the preamble signal is used to indicate the available duration in the unlicensed spectrum, and the available duration is a length of the time-domain interval of the available time-frequency resources.

In an optional embodiment, at least two different preamble signals indicate different duration.

In an optional embodiment, the downlink control information or the preamble message further includes at least one of a cell identifier of the unlicensed spectrum, a public land mobile network identifier of the unlicensed spectrum, or a quantity of symbols occupied by the downlink control information.

In an optional embodiment, the preamble signal is used to indicate the available duration of the base station in the unlicensed spectrum, and at least two different preamble signals are corresponding to different duration.

In an optional embodiment, the sending unit is further configured to send, in n symbols at the beginning of a second subframe, the downlink control channel on which the second subframe is scheduled. The second subframe is in the duration and is after the first subframe. In an optional embodiment, the downlink control information further includes a forward scheduling indication. Optionally, the forward scheduling indication may be included in the scheduling indication information. The forward scheduling indication is used by the user equipment to determine the downlink control information according to the forward scheduling indication, and is used to schedule data in a subframe before a subframe in which the downlink control information is located.

In an optional embodiment, the preamble signal occupies fixed duration in the time domain.

In an optional embodiment, the downlink control information or the preamble signal further includes a radio network temporary identifier RNTI. The RNTI is used by the user equipment to receive the downlink control information according to the RNTI. Optionally, the downlink control information may further include at least one of duration of sending the first signal, a cell identifier of a first carrier, a public land mobile network identifier of the first carrier, or a quantity of symbols occupied by the downlink control information.

In an optional implementation manner, the processing unit 401 may be a processor. The processor may be specifically a baseband processor, a digital signal processor (DSP), a field programmable gate array (FPGA), or a central processor (CPU). The sending unit 402 may be a transmitter. The sending unit 402 may also be a transceiver. The transmitter or the transceiver may be a radio frequency circuit or a combination that includes the processor and a radio frequency circuit.

In an optional implementation manner, the base station provided in the embodiment shown in FIG. 4 may include a transmitter and a processor. The processor is configured to determine a time-domain interval of available time-frequency resources in an unlicensed spectrum. The available resources are continuous time-frequency resources in a time domain. The transmitter is configured to send a preamble signal in a first subframe in the interval. The first subframe is an initial subframe in the interval. The transmitter is further configured to send downlink control information and data after the sending unit sends the preamble signal. The data is in the first subframe. The downlink control information is in a downlink control channel. The downlink control information includes scheduling indication information. The scheduling indication information is used to indicate a frequency-domain location of the data.

Figure 5:
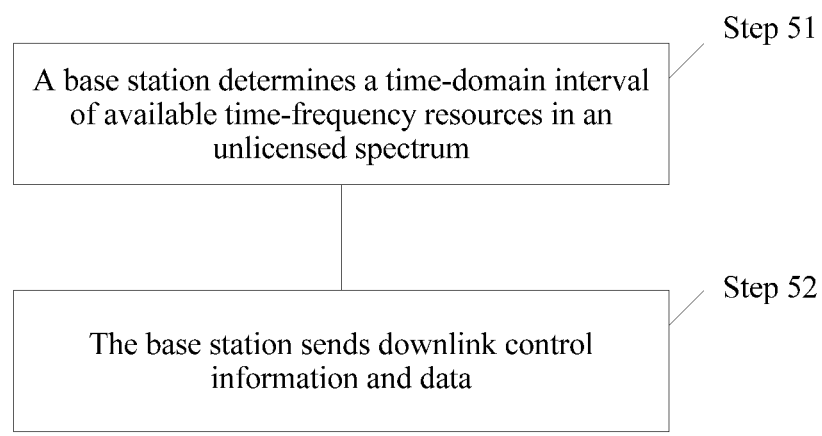
FIG. 5 shows a data sending method according to an embodiment of the present invention.

FIG. 5 shows a data sending method according to an embodiment of the present invention, and specific steps of the method are as follows:

Step 51: A base station determines a time-domain interval of available time-frequency resources in an unlicensed spectrum. The available time-frequency resources are continuous time-frequency resources in a time domain.

Step 52: The base station sends downlink control information and data.

The data is in a first subframe, and the first subframe is an initial subframe in the interval. The downlink control information includes scheduling indication information and location indication information. The scheduling indication information is used to indicate a frequency-domain location of the data. The location indication information is used to indicate a time-domain location of the data.

In the prior art, a base station sends only a preamble after determining a time-domain interval of available time-frequency resources in an unlicensed spectrum. The preamble in the prior art is used to only occupy a channel, and user equipment cannot receive data or scheduling information when the preamble occupies the channel. However, in this embodiment of the present invention, after the base station determines the time-domain interval of the available time-frequency resources in the unlicensed spectrum, the base station sends the downlink control information and the data. The data is in the first subframe. Therefore, at least the data is sent in the first subframe, so as to improve spectrum utilization resource.

In an optional embodiment, that a base station determines a time-domain interval of available time-frequency resources in an unlicensed spectrum includes: the base station may first determine, by means of listening, whether a signal is being sent on a wireless channel on which the first carrier is located, and if there is no another device using the wireless channel, the base station determines that a signal may be sent by using the first carrier. Optionally, a processing period may be required for the base station to prepare a to-be-sent signal. In order to prevent the channel being occupied by another device in the processing period, the base station may transmit specific content with specific power on the channel in the period. In this case, it is determined that the time-domain interval of the available time-frequency resources in the unlicensed spectrum starts after the specific content is transmitted.

In an optional embodiment, the downlink control information is in a downlink control channel, and the first subframe includes N symbols in the time domain. The downlink control channel is located in n symbols at the beginning of a second subframe, and the location indication information is further used to indicate that the first subframe is a subframe before the second subframe. Alternatively, the downlink control channel is located in last n symbols of the first subframe, where 0<n<N, and both n and N are natural numbers.

In an optional embodiment, the location indication information is used to instruct the UE to determine a start symbol m of the data in the first subframe in the time domain according to the indication information. When the downlink control channel is located in the n symbols at the beginning of the second subframe, the data in the first subframe is between the symbol m and a last symbol of the first subframe. Alternatively, when the downlink control channel is located in the last n symbols of the first subframe, the data in the first subframe is after the symbol m and before the downlink control channel. Optionally, m is a natural number.

In an optional embodiment, the downlink control information further includes duration indication information, and the duration indication information is used to indicate available duration in the unlicensed spectrum.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the base station sends, in the n symbols at the beginning of the second subframe, the downlink control channel on which the first subframe is scheduled. The second subframe is in the duration and is after the first subframe. In an optional embodiment, the downlink control information further includes a forward scheduling indication. Optionally, the forward scheduling indication may be included in the scheduling indication information. The forward scheduling indication is used by the user equipment to determine the downlink control information according to the forward scheduling indication, and is used to schedule data in a subframe before a subframe in which the downlink control information is located.

In an optional embodiment, the first subframe includes N symbols in the time domain, and the preamble occupies M symbols. If M=N, data is not sent in the first subframe. Alternatively, if M>N, a part of preamble information is sent in the first subframe, and a remaining part of preamble information is sent at M–N symbols at the beginning of the second subframe after the first subframe. Data is sent in subsequent symbols of the second subframe. Control information corresponding to the data is sent in a third subframe after the second subframe. Alternatively, control information and data information are sent in subsequent symbols of the second subframe. The control information may be after the preamble information or may be in last P symbols of the second subframe, and the control information is used to include scheduling information of the data.

In an optional embodiment, the downlink control information or the preamble signal further includes a radio network temporary identifier RNTI. The RNTI is used by the user equipment to receive the downlink control information according to the RNTI. Optionally, the downlink control information may further include at least one of duration of sending a first signal, a cell identifier of the first carrier, a public land mobile network identifier of the first carrier, or a quantity of symbols occupied by the downlink control information.

In an optional embodiment, the downlink control information may be sent by using a secondary cell corresponding to the unlicensed spectrum, or may be sent by using a carrier corresponding to a licensed spectrum. The carrier corresponding to the licensed spectrum and the secondary carrier corresponding to the unlicensed spectrum are different carriers configured for same user equipment.

In an optional embodiment, the downlink control information is sent at the beginning of the first subframe in the interval, and the data information is sent after the control information is sent. If the control information sending ends at a boundary of the first subframe, the data information is not sent in the first subframe.

Figure 6:
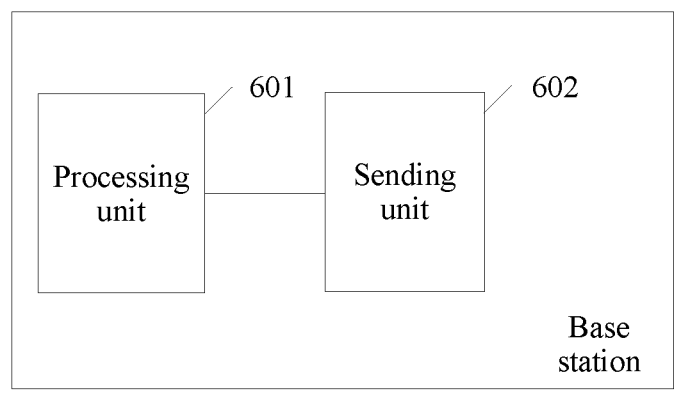
FIG. 6 shows a base station according to an embodiment of the present invention.

FIG. 6 shows a base station according to an embodiment of the present invention. The base station may be configured to execute the data sending method provided in the embodiment shown in FIG. 5. The base station includes a processing unit 601 and a sending unit 602.

The processing unit 601 is configured to determine a time-domain interval of available time-frequency resources in an unlicensed spectrum. The available time-frequency resources are continuous time-frequency resources in a time domain.

The sending unit 602 is configured to send downlink control information and data. The data is in a first subframe. The first subframe is an initial subframe in the interval. The downlink control information includes scheduling indication information and location indication information. The scheduling indication information is used to indicate a frequency-domain location of the data. The location indication information is used to indicate a time-domain location of the data.

In the prior art, a base station sends only a preamble after determining a time-domain interval of available time-frequency resources in an unlicensed spectrum. The preamble in the prior art is used to only occupy a channel, and user equipment cannot receive data or scheduling information when the preamble occupies the channel. However, in this embodiment of the present invention, after the base station determines the time-domain interval of the available time-frequency resources in the unlicensed spectrum, the base station sends the downlink control information and the data. The data is in the first subframe. Therefore, at least the data is sent in the first subframe, so as to improve spectrum utilization resource.

In an optional embodiment, the downlink control information is in a downlink control channel, and the first subframe includes N symbols in the time domain. The downlink control channel is located in n symbols at the beginning of a second subframe, and the location indication information is further used to indicate that the first subframe is a subframe before the second subframe. Alternatively, the downlink control channel is located in last n symbols of the first subframe, where 0<n<N, and both n and N are natural numbers.

In an optional embodiment, the location indication information is used to indicate a start symbol m of the data in the first subframe in the time domain. When the downlink control channel is located in the n symbols at the beginning of the second subframe, the data in the first subframe is between the symbol m and a last symbol of the first subframe. Alternatively, when the downlink control channel is located in the last n symbols of the first subframe, the data in the first subframe is after the symbol m and before the downlink control channel.

In an optional embodiment, the downlink control information further includes duration indication information, and the duration indication information is used to indicate available duration in the unlicensed spectrum.

In an optional embodiment, the downlink control information or the preamble message further includes at least one of a cell identifier of the unlicensed spectrum, a public land mobile network identifier of the unlicensed spectrum, or a quantity of symbols occupied by the downlink control information.

In an optional embodiment, the base station sends, in n symbols at the beginning of a third subframe, a downlink control channel on which the third subframe is scheduled. The third subframe is in the interval. The downlink control information further includes data symbol indication information, so that the user equipment determines an end location of the data in the third subframe according to the symbol indication information. In an optional embodiment, the third subframe is a last subframe in the interval.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the sending unit 602 is further configured to send, in the n symbols at the beginning of the second subframe, the downlink control channel on which the first subframe is scheduled. The second subframe is in the duration and is after the first subframe. In an optional embodiment, the downlink control information further includes a forward scheduling indication. Optionally, the forward scheduling indication may be included in the scheduling indication information. The forward scheduling indication is used by the user equipment to determine the downlink control information according to the forward scheduling indication, and is used to schedule data in a subframe before a subframe in which the downlink control information is located.

In an optional embodiment, the first subframe includes N symbols in the time domain, and the preamble occupies M symbols. If M=N, data is not sent in the first subframe. Alternatively, if M>N, a part of preamble information is sent in the first subframe, and a remaining part of preamble information is sent at M−N symbols at the beginning of the second subframe after the first subframe. Data is sent in subsequent symbols of the second subframe. Control information corresponding to the data is sent in a third subframe after the second subframe. Alternatively, control information and data information are sent in subsequent symbols of the second subframe. The control information may be after the preamble information or may be in last P symbols of the second subframe, and the control information is used to include scheduling information of the data.

In an optional embodiment, the downlink control information may be sent by using a secondary cell corresponding to the unlicensed spectrum, or may be sent by using a carrier corresponding to a licensed spectrum. The carrier corresponding to the licensed spectrum and the secondary carrier corresponding to the unlicensed spectrum are different carriers configured for same user equipment.

In an optional embodiment, the downlink control information is sent at the beginning of the first subframe in the interval, and the data information is sent after the control information is sent. If the control information sending ends at a boundary of the first subframe, the data information is not sent in the first subframe.

In an optional embodiment, the downlink control information or the preamble signal further includes a radio network temporary identifier RNTI. The RNTI is used by the user equipment to receive the downlink control information according to the RNTI. Optionally, the downlink control information may further include at least one of duration of sending a first signal, a cell identifier of a first carrier, a public land mobile network identifier of the first carrier, or a quantity of symbols occupied by the downlink control information.

In an optional implementation manner, the processing unit 601 may be a processor. The processor may be specifically a baseband processor, a digital signal processor (DSP), a field programmable gate array (FPGA), or a central processor (CPU). The sending unit 602 may be a transmitter. The sending unit 602 may also be a transceiver. The transmitter or the transceiver may be a radio frequency circuit or a combination that includes the processor and a radio frequency circuit.

In an optional implementation manner, the base station provided in the embodiment shown in FIG. 6 may include a transmitter and a processor. The processor is configured to determine a time-domain interval of available time-frequency resources in an unlicensed spectrum. The available time-frequency resources are continuous time-frequency resources in a time domain. The transmitter is configured to send downlink control information and data. The data is in a first subframe, and the first subframe is an initial subframe in the interval. The downlink control information is in a downlink control channel. The downlink control information includes scheduling indication information and location indication information. The scheduling indication information is used to indicate a frequency-domain location of the data. The location indication information is used to indicate a time-domain location of the data.

Figure 7:
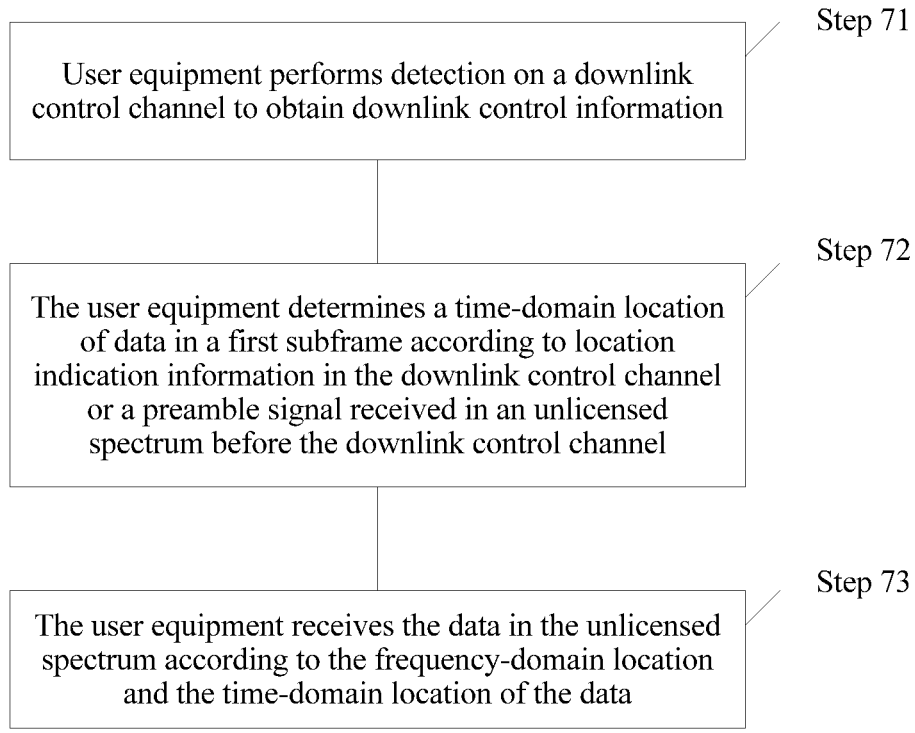
FIG. 7 shows a data sending method according to an embodiment of the present invention.

FIG. 7 shows a data sending method according to an embodiment of the present invention, and specific steps of the method are as follows:

Step 71: User equipment performs detection on a downlink control channel to obtain downlink control information.

The downlink control information includes scheduling indication information. The scheduling indication information is used to indicate a frequency-domain location of scheduled data in a first subframe. Optionally, the downlink control channel is a physical downlink control channel (PDCCH).

Step 72: The user equipment determines a time-domain location of data in a first subframe according to location indication information in the downlink control channel or a preamble signal received in an unlicensed spectrum before the downlink control channel. The location indication information is used to indicate the time-domain location of the data in the first subframe.

Step 73: The user equipment receives the data in the unlicensed spectrum according to the frequency-domain location and the time-domain location of the data.

In the prior art, user equipment can only determine a frequency-domain location of data according to downlink control information, but cannot determine a time-domain location of the data. However, in this embodiment of the present invention, the user equipment determines the time-domain location of the data in the first subframe according to the location indication information in the downlink control channel or the preamble signal received in the unlicensed spectrum before the downlink control channel. Therefore, the user equipment may determine the time-domain location of the data according to the location indication information or the preamble signal, so that utilization of an unlicensed carrier is more flexible, and spectrum utilization resource is improved.

In an optional embodiment, before the user equipment performs detection on the downlink control channel to obtain the downlink control information, the method further includes: receiving, by the user equipment, the preamble signal in the unlicensed spectrum. The preamble signal is a sequence in at least one preset sequence.

Optionally, the preamble signal may be specifically a predefined sequence. The base station sends the preamble signal by using the predefined sequence, and the user equipment performs detection on the preamble signal according to the predefined sequence. The predefined preamble sequence may be preset in the user equipment or may be received from the base station by using a message. Optionally, a specific mapping relationship may exist between the preamble sequence and the unlicensed spectrum, so that the user equipment determines, according to the sequence, a signal including the preamble signal as a signal of a serving cell corresponding to the unlicensed secondary carrier.

In an optional embodiment, before the user equipment performs detection on the downlink control channel to obtain the downlink control information, the method further includes: after receiving the preamble signal, determining, by the user equipment, a location of the downlink control channel in the unlicensed spectrum according to the preamble signal.

In an optional embodiment, the subframe includes N symbols in the time domain. The downlink control channel is located in n symbols following the preamble signal. Certainly, the downlink control channel may be located in n symbols after the preamble signal, and a distance of m symbols exists between the downlink control channel and the preamble signal, where m is a natural number. The downlink control channel is located in last n symbols of a subframe in which the preamble signal is located. Alternatively, the downlink control channel is an enhanced physical downlink control channel, the enhanced physical downlink control channel is located in a subframe in which the preamble signal is located, and the enhanced physical downlink control channel is located in a symbol after the preamble signal. The first subframe is the subframe in which the preamble signal is located, 0<n<N, and both n and N are natural numbers.

In an optional embodiment, the UE performs blind detection on the downlink control information to determine a symbol location of the downlink control information, and then determines a symbol location of the data part according to the location of the downlink control information. Specifically, for the foregoing manner of sending the downlink control information, because the user equipment does not determine a symbol from which the base station starts to send the downlink control information, the user equipment needs to perform downlink control information detection on symbols one by one. The downlink control information detection is performed on each symbol that is used as a start symbol of the downlink control information. Once the downlink control information is detected, the user equipment determines the symbol location of the data part according to the downlink control information, and then receives, according to the time-domain symbol location of the data part and the frequency-domain location included in the scheduling indication information carried in the downlink control information, the scheduled data indicated in the downlink control information.

In an optional embodiment, that the user equipment determines a time-domain location of data in a first subframe according to a preamble signal received before the downlink control channel includes: the user equipment determines a symbol in which the preamble signal is located, and the user equipment determines, according to the symbol in which the preamble signal is located and a symbol in which the downlink control channel is located, a symbol in which the data in the first subframe is located. Specifically, the symbol location occupied by the preamble signal is determined according to a start symbol location and a length of the preamble signal, and the length of the preamble signal is a predefined quantity of symbols. The location of the downlink control information or the location of the data starts at N symbols after the preamble signal sending ends, and N is a positive integer greater than or equal to 0. N=0 indicates that the location of the downlink control information or the location of the data starts immediately after the preamble signal is sent. The UE starts to receive the downlink control information or the data at N symbols after the preamble signal sending ends. The data ends at a subframe end boundary of the subframe in which the preamble signal is located.

In an optional embodiment, the location indication information is used to indicate a start symbol m of the data in the first subframe in the time domain. That the user equipment determines a time-domain location of data in a first subframe according to location indication information in the downlink control channel includes: when the downlink control channel is located in the n symbols following the preamble signal, the user equipment determines that the data in the first subframe is between the symbol m and a last symbol of the first subframe; or when the downlink control channel is located in the last n symbols of the subframe in which the preamble signal is located, the user equipment determines that the data in the first subframe is between the symbol m and a symbol before the downlink control channel.

In an optional embodiment, the downlink control channel is located in last n symbols of a detected subframe, and the first subframe is a subframe in which the downlink control channel is located. Specifically, the user equipment performs downlink control information detection according to a location of the downlink control information predetermined at the end of the subframe structure. If the downlink control information is detected, a start location of the scheduled data is determined, according to the downlink control information, as a location of starting to send the signal by using a first carrier.

In an optional embodiment, that the user equipment performs detection on a downlink control channel to obtain downlink control information includes: the user equipment performs detection on a first downlink control channel and a second downlink control channel. The first downlink control channel is located in n symbols at the beginning of a detected subframe, and the second downlink control channel is located in last n symbols of the detected subframe. If the downlink control information is obtained in the second downlink control channel, the downlink control information includes the scheduling indication information, and the first subframe is a subframe in which the downlink control channel is located. In an optional embodiment, the location indication information is used to indicate a start symbol m of the data in the first subframe in the time domain. That the user equipment determines a time-domain location of data in a first subframe according to location indication information in the downlink control channel includes: the user equipment determines that the data in the first subframe is between the symbol m and a symbol before the downlink control channel.

In an optional embodiment, that the user equipment performs detection on a downlink control channel to obtain downlink control information includes: the user equipment performs detection on the downlink control channel to obtain the downlink control information, where the downlink control channel is located in n symbols at the beginning of a detected subframe. When the downlink control information includes the location indication information, the user equipment determines that the first subframe is a subframe before a subframe in which the downlink control channel is located.

In an optional embodiment, the user equipment performs detection on the downlink control channel by using the first carrier or another carrier, to obtain the downlink control information.

In an optional embodiment, the downlink control information further includes a forward scheduling indication. Optionally, the forward scheduling indication may be included in the scheduling indication information. The forward scheduling indication is used by the user equipment to determine the downlink control information according to the forward scheduling indication, and is used to schedule data in a subframe before a subframe in which the downlink control information is located.

In an optional embodiment, the location indication information is used to indicate a start symbol m of the data in the first subframe in the time domain. That the user equipment determines a time-domain location of data in a first subframe according to location indication information in the downlink control channel includes: the user equipment determines that the data in the first subframe is between the symbol m and a last symbol of the first subframe.

In an optional embodiment, the downlink control information further includes duration indication information, and the duration indication information is used to indicate available duration of the base station in the unlicensed spectrum. In an optional embodiment, the preamble signal may also include duration indication information, and the duration indication information is used to indicate available duration of the base station in the unlicensed spectrum. In an optional embodiment, the downlink control information or the preamble message further includes at least one of a cell identifier of the unlicensed spectrum, a public land mobile network identifier of the unlicensed spectrum, or a quantity of symbols occupied by the downlink control information. The user equipment determines a last subframe in the available duration of the base station in the unlicensed spectrum and a symbol length of the last subframe according to the available duration of the base station in the unlicensed spectrum and a symbol length of the first subframe. Specifically, for example, the symbol length of the first subframe is 5 symbols, and duration of sending the first signal is 6 ms. It is assumed that a symbol length of a last subframe of each frame is 14 symbols. The last subframe is the seventh subframe, and the symbol length of the last subframe is 9 symbols. The user equipment may determine, according to the cell identifier of the unlicensed spectrum and/or the public land mobile network identifier of the unlicensed spectrum, whether a cell in which the preamble signal is currently sent is an unlicensed secondary carrier cell configured for the user equipment.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the preamble signal is used to indicate available duration of the base station in the unlicensed spectrum, and at least two different preamble signals indicate different duration.

In an optional embodiment, the user equipment detects, in n symbols at the beginning of a second subframe, the downlink control channel on which the second subframe is scheduled. The second subframe is in the duration and is after the first subframe.

In an optional embodiment, the downlink control information further includes a radio network temporary identifier RNTI. The RNTI is used to receive the downlink control information according to the RNTI.

In an optional embodiment, the preamble signal occupies fixed duration in the time domain.

Figure 8:
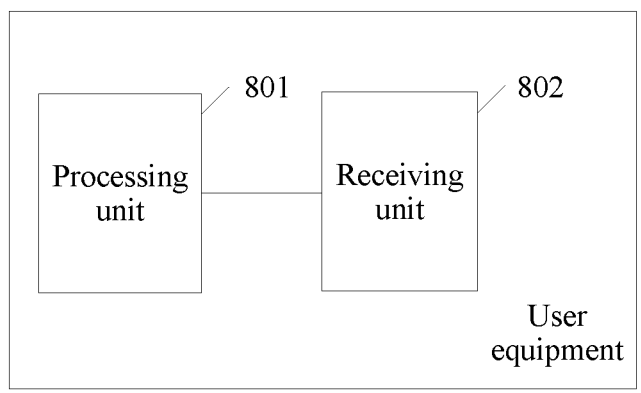
FIG. 8 shows user equipment according to an embodiment of the present invention.

FIG. 8 shows user equipment according to an embodiment of the present invention. The user equipment may be configured to execute the data sending method provided in the embodiment shown in FIG. 7. The user equipment includes a processing unit 801 and a receiving unit 802.

The processing unit 801 is configured to perform detection on a downlink control channel to obtain downlink control information. The downlink control information includes scheduling indication information. The scheduling indication information is used to indicate a frequency-domain location of scheduled data in a first subframe. Optionally, the downlink control channel is a physical downlink control channel (PDCCH).

The processing unit 801 is further configured to determine a time-domain location of the data in the first subframe according to location indication information in the downlink control channel or a preamble signal received in an unlicensed spectrum before the downlink control channel. The location indication information is used to indicate the time-domain location of the data in the first subframe.

The receiving unit 802 is configured to receive the data in the unlicensed spectrum according to the frequency-domain location and the time-domain location of the data.

In the prior art, user equipment can only determine a frequency-domain location of data according to downlink control information, but cannot determine a time-domain location of the data. However, in this embodiment of the present invention, the user equipment determines the time-domain location of the data in the first subframe according to the location indication information in the downlink control channel or the preamble signal received in the unlicensed spectrum before the downlink control channel. Therefore, the user equipment may determine the time-domain location of the data according to the location indication information or the preamble signal, so that utilization of an unlicensed carrier is more flexible, and spectrum utilization resource is improved.

In an optional embodiment, before the processing unit 801 performs detection on the downlink control channel to obtain the downlink control information, the receiving unit 802 further includes: receive the preamble signal in the unlicensed spectrum. The preamble signal is a sequence in at least one preset sequence.

Optionally, the preamble signal may be specifically a predefined sequence. The base station sends the preamble signal by using the predefined sequence, and the user equipment performs detection on the preamble signal according to the predefined sequence. The predefined preamble sequence may be preset in the user equipment or may be received from the base station by using a message. Optionally, a specific mapping relationship may exist between the preamble sequence and the unlicensed carrier, so that the user equipment determines, according to the sequence, a signal including the preamble signal as a signal of a serving cell corresponding to the unlicensed secondary carrier.

In an optional embodiment, before the processing unit 801 performs detection on the downlink control channel to obtain the downlink control information, the processing unit 801 further includes: after receiving the preamble signal, determine, by the processing unit, a location of the downlink control channel in the unlicensed spectrum according to the preamble signal.

In an optional embodiment, the subframe includes N symbols in the time domain. The downlink control channel is located in n symbols following the preamble signal. Certainly, the downlink control channel may be located in n symbols after the preamble signal, and a distance of m symbols exists between the downlink control channel and the preamble signal, where m is a natural number. The downlink control channel is located in last n symbols of a subframe in which the preamble signal is located. Alternatively, the downlink control channel is an enhanced physical downlink control channel, the enhanced physical downlink control channel is located in a subframe in which the preamble signal is located, and the enhanced physical downlink control channel is located in a symbol after the preamble signal. The first subframe is the subframe in which the preamble signal is located, $0<n<N$, and both n and N are natural numbers.

In an optional embodiment, that the processing unit 801 determines a time-domain location of the data in the first subframe according to a preamble signal received before the downlink control channel includes: the processing unit 801 determines a symbol in which the preamble signal is located; and the processing unit 801 determines, according to the symbol in which the preamble signal is located and a symbol in which the downlink control channel is located, a symbol in which the data in the first subframe is located.

In an optional embodiment, the UE performs blind detection on the downlink control information to determine a symbol location of the downlink control information, and then determines a symbol location of the data part according to the location of the downlink control information. Specifically, for the foregoing manner of sending the downlink control information, because the UE does not determine a symbol from which the base station starts to send the downlink control information, the user equipment needs to perform downlink control information detection on symbols one by one. The downlink control information detection is performed on each symbol that is used as a start symbol of the downlink control information. Once the downlink control information is detected, the user equipment determines the symbol location of the data part according to the downlink control information, and then receives, according to the time-domain symbol location of the data part and the frequency-domain location included in the scheduling indication information carried in the downlink control information, the scheduled data indicated in the downlink control information.

In an optional embodiment, that the user equipment determines a time-domain location of the data in the first subframe according to a preamble signal received before the downlink control channel includes: the user equipment determines a symbol in which the preamble signal is located, and the user equipment determines, according to the symbol in which the preamble signal is located and a symbol in which the downlink control channel is located, a symbol in which the data in the first subframe is located. Specifically, the symbol location occupied by the preamble signal is determined according to a start symbol location and a length of the preamble signal, and the length of the preamble signal is a predefined quantity of symbols. The location of the downlink control information or the location of the data starts at N symbols after the preamble signal sending ends, and N is a positive integer greater than or equal to 0. N=0 indicates that the location of the downlink control information or the location of the data starts immediately after the preamble signal is sent. The UE starts to receive the downlink control information or the data at N symbols after the preamble signal sending ends. The data ends at a subframe end boundary of the subframe in which the preamble signal is located.

In an optional embodiment, the preamble signal may be further used by the user equipment to determine that the signal sent by using the unlicensed carrier is sent to a cell in which the user equipment is located.

In an optional embodiment, the location indication information is used to indicate a start symbol m of the data in the first subframe in the time domain. That the processing unit 801 determines a time-domain location of the data in the first subframe according to location indication information in the downlink control channel includes: when the downlink control channel is located in the n symbols following the preamble signal, the processing unit 801 determines that the data in the first subframe is between the symbol m and a last symbol of the first subframe; or when the downlink control channel is located in the last n symbols of the subframe in which the preamble signal is located, the processing unit 801 determines that the data in the first subframe is between the symbol m and a symbol before the downlink control channel.

In an optional embodiment, the downlink control channel is located in last n symbols of a detected subframe, and the first subframe is a subframe in which the downlink control channel is located. Specifically, the user equipment performs downlink control information detection according to a location of the downlink control information predetermined at the end of the subframe structure. If the downlink control information is detected, a start location of the scheduled data is determined, according to the downlink control information, as a location of starting to send the signal by using a first carrier.

In an optional embodiment, that the processing unit 801 performs detection on a downlink control channel to obtain downlink control information includes: the processing unit 801 performs detection on a first downlink control channel and a second downlink control channel. The first downlink control channel is located in n symbols at the beginning of a detected subframe, and the second downlink control channel is located in last n symbols of the detected subframe. If the downlink control information is obtained in the second downlink control channel, the downlink control information includes the scheduling indication information, and the first subframe is a subframe in which the downlink control channel is located.

In an optional embodiment, the location indication information is used to indicate a start symbol m of the data in the first subframe in the time domain. That the processing unit 801 determines a time-domain location of the data in the first subframe according to location indication information in the downlink control channel includes: the processing unit 801 determines that the data in the first subframe is between the symbol m and a symbol before the downlink control channel.

In an optional embodiment, that the processing unit 801 performs detection on a downlink control channel to obtain downlink control information includes: the processing unit 801 performs detection on the downlink control channel to obtain the downlink control information, where the downlink control channel is located in n symbols at the beginning of a detected subframe; and when the downlink control information includes the location indication information, the processing unit 801 determines that the first subframe is a subframe before a subframe in which the downlink control channel is located.

In an optional embodiment, the location indication information is used to indicate a start symbol m of the data in the first subframe in the time domain. That the processing unit 801 determines a time-domain location of the data in the first subframe according to location indication information in the downlink control channel includes: the processing unit 801 determines that the data in the first subframe is between the symbol m and a last symbol of the first subframe.

In an optional embodiment, the downlink control information further includes duration indication information, and the duration indication information is used to indicate available duration of the base station in the unlicensed spectrum. In an optional embodiment, the downlink control information or the preamble message further includes at least one of a cell identifier of the unlicensed spectrum, a public land mobile network identifier of the unlicensed spectrum, or a quantity of symbols occupied by the downlink control information. The user equipment determines a last subframe in the available duration of the base station in the unlicensed spectrum and a symbol length of the last subframe according to the available duration of the base station in the unlicensed spectrum and a symbol length of the first subframe. Specifically, for example, the symbol length of the first subframe is 5 symbols, and duration of sending the first signal is 6 ms. It is assumed that a symbol length of a last subframe of each frame is 14 symbols. The last subframe is the seventh subframe, and the symbol length of the last subframe is 9 symbols. The user equipment may determine, according to the cell identifier of the unlicensed spectrum and/or the public land mobile network identifier of the unlicensed spectrum, whether a cell in which the preamble signal is currently sent is an unlicensed secondary carrier cell configured for the user equipment.

In an optional embodiment, the downlink control information includes first downlink control information and second downlink control information. The scheduling indication information is in the first downlink control information. The duration indication information is in the second downlink control information. The first downlink control information is in a user-specific search interval, and the second downlink control information is in a public search interval.

In an optional embodiment, the preamble signal is used to indicate available duration of the base station in the unlicensed spectrum, and at least two different preamble signals are corresponding to different duration.

In an optional embodiment, the processing unit 801 performs, in n symbols at the beginning of a second subframe, detection on the downlink control channel on which the second subframe is scheduled. The second subframe is in the duration and is after the first subframe.

In an optional embodiment, the downlink control information further includes a radio network temporary identifier RNTI. The RNTI is used to receive the downlink control information according to the RNTI.

In an optional embodiment, the preamble signal occupies fixed duration in the time domain.

In an optional implementation manner, the processing unit 801 may be a processor. The processor may be specifically a baseband processor, a digital signal processor (DSP), a field programmable gate array (FPGA), or a central processor (CPU). The receiving unit 802 may be a receiver. The receiving unit 802 may also be a transceiver. The receiver or the transceiver may be a radio frequency circuit or a combination that includes the processor and a radio frequency circuit.

In an optional implementation manner, the user equipment provided in the embodiment shown in FIG. 8 may include a receiver and a processor. The processor is configured to perform detection on a downlink control channel to obtain downlink control information. The downlink control information includes scheduling indication information. The scheduling indication information is used to indicate a frequency-domain location of scheduled data in a first subframe. The processor is further configured to determine a time-domain location of the data in the first subframe according to location indication information in the downlink control channel or a preamble signal received in an unlicensed spectrum before the downlink control channel. The location indication information is used to indicate the time-domain location of the data in the first subframe. The receiver is configured to receive the data in the unlicensed spectrum according to the frequency-domain location and the time-domain location of the data.

The following describes the embodiments of the present invention in more detail with reference to specific examples.

Figure 9:
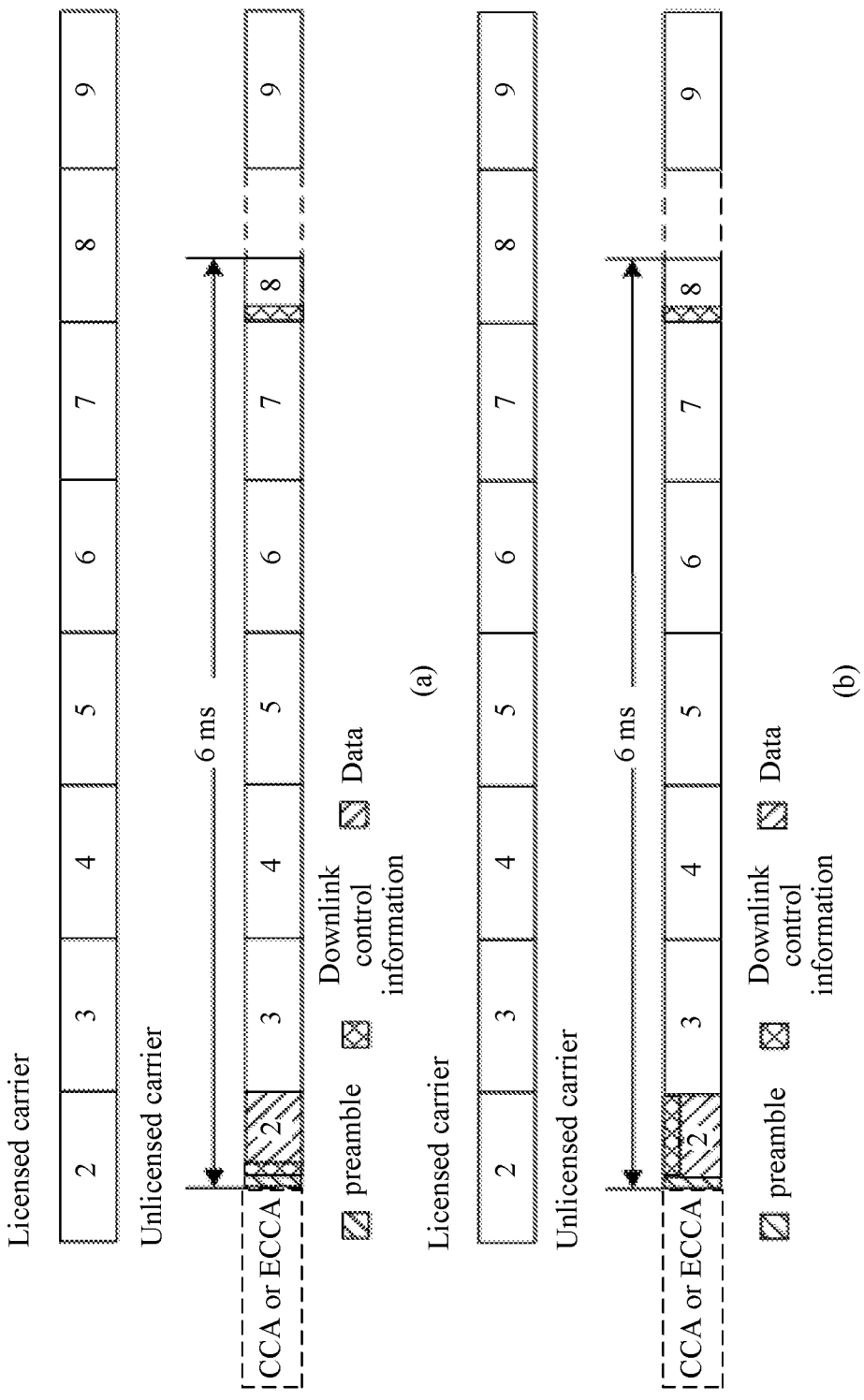
FIG. 9 is a structural diagram of subframes of an unlicensed carrier according to an embodiment of the present invention.

FIG. 9 is a structural diagram of subframes of an unlicensed carrier according to an embodiment of the present invention. As shown in FIG. 9, signal sending may start from a symbol at the middle of a subframe 2 by using an unlicensed carrier.

Specifically, a base station may determine, by means of CCA or ECCA, that sending a signal to UE may start from a first symbol of the subframe 2 of a first carrier.

The signal may include one or more of a preamble signal, downlink control information, or data. Time of occupying the unlicensed spectrum by the base station is limited, for example, may be 6 ms. Certainly, the time may be another value. This is not limited in this embodiment of the present invention. In this case, the base station may send the signal in duration of 6 ms. Specifically, the base station starts to send the preamble signal from the first symbol of the subframe 2. The preamble signal may occupy multiple symbols of the subframe 2. In this embodiment of the present invention, the preamble signal may be used to determine a time-domain location of the data. After the preamble signal is sent, the downlink control information and/or the data may be sent at a symbol of the subframe 2. Optionally, specifically, as shown in FIG. 9(a), the downlink control information is sent on a PDCCH, and the data is sent on a PDSCH.

For example, if the first symbol is a symbol 3 of the subframe 2, the base station sends the preamble at the symbol 3, sends the PDCCH at a symbol 4, and starts to send the data from a symbol 5 until a last symbol. Starting from a second subframe, the PDCCH is sent at first several symbols of each subframe, and the data is sent at subsequent symbols. For a last subframe, the PDCCH is sent at first several symbols of the last subframe, and the data is sent at subsequent symbols.

For another example, if the first symbol is a symbol 3 of the subframe 2, the base station sends the preamble at the symbol 3, starts to send the data from a symbol 4 until a symbol before a last symbol, and sends the PDCCH at the last symbol of the subframe 2. Starting from a second subframe, the PDCCH is sent at first several symbols of each subframe, and the data is sent at subsequent symbols. For a last subframe, the PDCCH is sent at first several symbols of the last subframe, and the data is sent at subsequent symbols.

The data is sent after the downlink control information is sent. In an optional embodiment, the base station starts to send the preamble signal from the first symbol of the subframe 2. The data is sent after the preamble signal is sent. The downlink control information is sent after the data is sent.

The subframe 2 in this embodiment is a first subframe in a time-domain interval of time-frequency resources that are in an unlicensed spectrum and are available to the base station.

In an optional embodiment, specifically, as shown in FIG. 9(*b*), the downlink control information is sent on an EPDCCH, and the data is sent on a PDSCH. For a case in which the downlink control information is sent on the EPDCCH, the preamble signal is sent at first two available symbols of the subframe 2, that is, the base station sends the preamble signal at a first symbol and a second symbol of the first subframe in the time-domain interval of the time-frequency resources that are in the unlicensed spectrum and are available to the base station. The downlink control information sending starts at a predetermined symbol. If a serial number of the predetermined symbol is greater than a serial number of the second symbol, the downlink control information and the data are sent at each symbol from the predetermined symbol to a last symbol of the first subframe. For example, the preamble signal sending ends at a symbol N of the first subframe, but a predetermined sending start location of the downlink control information sent on the EPDCCH is a symbol P. The sending start location of the downlink control information may be configured for user equipment by using a network, or may be stored in user equipment in a predetermining manner. If P>N, the downlink control information sending starts from the symbol P. If P<N, the downlink control information sending starts from a symbol N+1.

Optionally, after the preamble signal is sent, the downlink control information is not immediately sent. The downlink control information may be sent after several symbols.

In the embodiment shown in FIG. 9, because the signal at least occupies all symbols from the first symbol of the subframe 2 to a last symbol of the subframe 2, utilization of an unlicensed carrier is improved.

Optionally, the preamble signal is used by user equipment to determine a start location of the signal in a time domain. The preamble signal includes a preamble sequence. The user equipment may determine, by detecting the preamble sequence, that the signal sent by using the unlicensed carrier is sent to a cell to which the user equipment belongs. Optionally, the preamble signal may further carry at least one of duration of the signal, a cell identifier of the unlicensed carrier, a public land mobile network identifier of the unlicensed carrier, or a quantity of symbols occupied by the downlink control information.

For the subframe 2, the user equipment determines, by detecting the preamble signal sent by the base station, that the signal sent by using the unlicensed carrier is sent to the cell to which the user equipment belongs. Then, the user equipment receives the downlink control information and the data subsequent to the preamble signal, and reads, according to the downlink control information, the scheduled data indicated in the downlink control information.

For the signal receiving at middle subframes, because subframes subsequent to the first subframe are complete subframes other than a last subframe occupied by the signal, the base station may send the downlink control information and the data according to the prior art, and the user equipment may receive the downlink control information and the data according to the prior art. The downlink control information may be obtained from the PDCCH or the EPDCCH of the first carrier, or may be obtained from a PDCCH or an E-PDCCH of another carrier.

For the signal receiving at a last subframe occupied by the signal, if the user equipment obtains, from the preamble signal, available duration of the base station in the unlicensed carrier, the user equipment may learn of a last subframe and a last symbol of the last subframe according to a symbol of a start moment for sending the signal.

Specifically, as shown in FIG. 9, if the user equipment learns, according to the preamble signal, that the duration of the signal is 6 ms and that a start symbol for sending the signal is a fifth symbol of the subframe 2, five complete subframes and two incomplete subframes exist in this transmission, and specifically are the symbol 5 to a symbol 14 of the subframe 2, a subframe 3 to a subframe 7, and a first symbol to a fourth symbol of a subframe 8. The user equipment may determine that the subframe 8 is an end subframe, and a length of total symbols occupied by the first signal in the subframe 8 is four symbols. The UE may receive the downlink control information and the data at the last symbol according to the information. For example, if the downlink control information is received on the PDCCH, after subtracting symbols occupied by the downlink control information, the user equipment receives the data at remaining symbols, in the four symbols of the subframe 8, that are used as the PDSCH on which the data is located. If the downlink control information is received on the EPDCCH, the user equipment uses the fourth symbol of the subframe 8 as an end symbol of receiving the downlink control information on the EPDCCH, and receives the data at the first four symbols of the subframe 8 that are used as the PDSCH on which the data is located.

For the signal receiving at the last subframe occupied by the signal, in an optional embodiment, the base station adds location information of a symbol occupied by the data into the downlink control information, and the user equipment determines a location of the data according to the location information, and receives the data on the PDSCH according to the location. For example, if an end symbol of data sending is carried in the downlink control information, the user equipment determines an end location of the data on the PDSCH according to the end symbol and receives the data.

The preamble signal described in this embodiment of the present invention is not a preamble signal sent by a base station after CCA or ECCA in the prior art. In the prior art, the preamble signal is used to only occupy a channel, to prevent the channel being occupied by another base station. However, in this embodiment of the present invention, user equipment may determine a time-domain location of data in a first subframe according to the preamble signal. The preamble signal is a sequence in at least one preset sequence. The user equipment may determine duration of the first signal according to different preset sequences. After receiving the preamble signal, the user equipment determines a location of a downlink control channel in an unlicensed spectrum according to the preamble signal. The user equipment does not need to cache a large quantity of signals to detect downlink control information. After receiving the preamble signal, the user equipment may determine the location of the downlink control channel and obtain the downlink control information. In this case, the user equipment only needs to perform downlink control information detection in limited symbols, to identify the downlink control information specific to the user equipment, and then reads the data according to scheduling indication information in the downlink control information.

Figure 10:
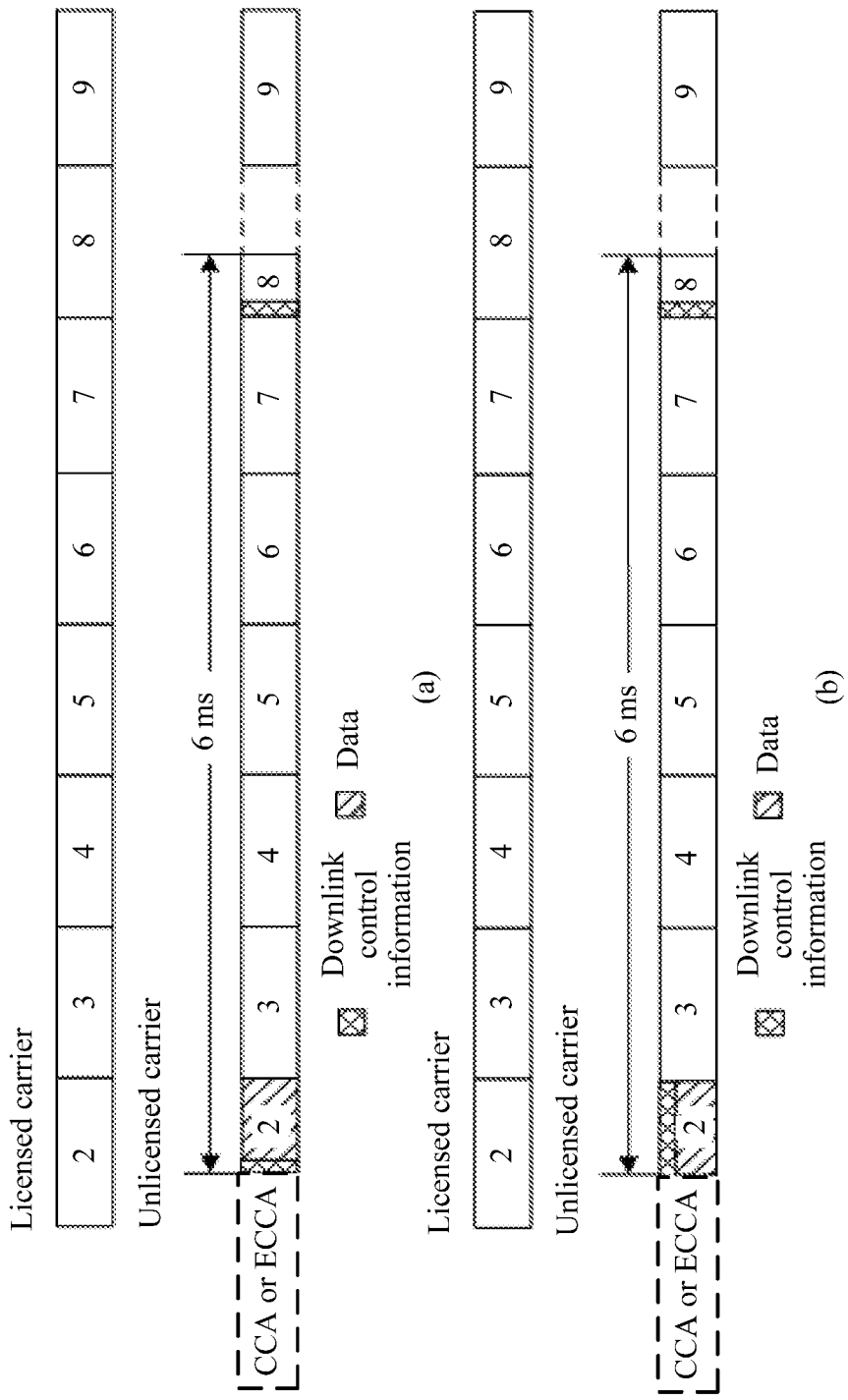
FIG. 10 is a structural diagram of subframes of an unlicensed carrier according to an embodiment of the present invention.

FIG. 10 is a structural diagram of subframes of an unlicensed carrier according to an embodiment of the present invention. A structure of the subframes of the unlicensed carrier shown in FIG. 10 is basically the same as the structure of the subframes of the unlicensed carrier shown in FIG. 9, and same content is not repeatedly described herein. A difference between the embodiment shown in FIG. 10 and the embodiment shown in FIG. 9 lies in that a first signal in the embodiment shown in FIG. 10 does not include a preamble signal, but a first signal in the embodiment shown in FIG. 9 includes a preamble signal.

A base station starts to send a first signal from a first symbol of a subframe. The first signal includes downlink control information and data. For example, duration of the first signal is 6 ms. Specifically, the base station starts to send the downlink control information from the first symbol of the subframe. Optionally, the downlink control information is sent on a PDCCH, and the data is sent on a PDSCH. Specifically, as shown in FIG. 10(*a*), the downlink control information includes an RNTI. The RNTI is used by user equipment to determine that the downlink control information is sent to the user equipment. The data is sent after the downlink control information is sent.

In an optional embodiment, the base station sends the downlink control information and the data on each symbol from the first symbol of the subframe to the subframe. Specifically, as shown in FIG. 10(*b*), the downlink control information includes a radio network temporary identifier (RNTI). The RNTI is used by user equipment to determine that the downlink control information is sent to the user equipment.

In an optional embodiment, after the preamble signal is sent, the downlink control information is not immediately sent. The downlink control information may be sent after several symbols.

When receiving the signal, the user equipment cannot learn of a symbol at which the base station starts to send the downlink control information. Therefore, the base station needs to perform detection on symbols one by one, and the detection starts from the first symbol of the subframe. Once the downlink control information that belongs to the user equipment is detected, the user equipment reads, according to the downlink control information, the scheduled data indicated in the downlink control information.

Figure 11:
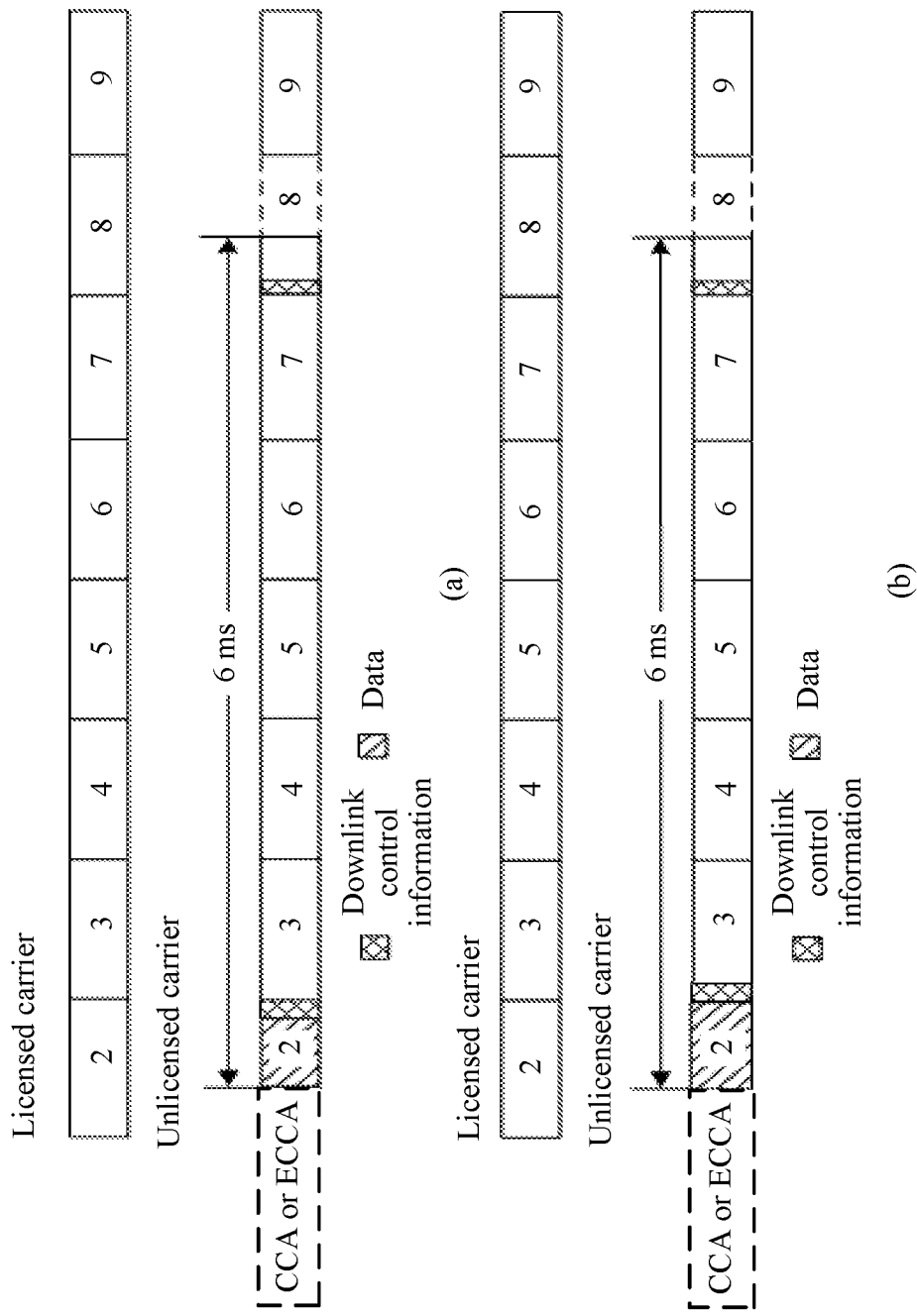
FIG. 11 is a structural diagram of subframes of an unlicensed carrier according to an embodiment of the present invention.

FIG. 11 is a structural diagram of subframes of an unlicensed carrier according to an embodiment of the present invention. As shown in FIG. 11, signal sending may start from a symbol at the middle of a second subframe by using an unlicensed carrier.

Optionally, a base station determines, by means of CCA or ECCA, that signal sending may start from a first symbol of the subframe 2 by using a first carrier.

The base station starts to send the signal from the first symbol of the subframe 2. The signal includes downlink control information and data. For example, duration of the signal is 6 ms.

In an optional embodiment, the base station starts to send the data from the first symbol of the subframe 2, and sends the downlink control information after the data is sent. The downlink control information is sent at last N symbols of the subframe 2, and N is a natural number. Specifically, as shown in FIG. 11(*a*), the downlink control information is sent at several symbols at the end of a first subframe, and the downlink control information is sent on a PDCCH.

In an optional embodiment, the base station sends the data at at least one symbol from the first symbol of the subframe 2 to a last symbol of the subframe 2, and sends the downlink control information at a subframe following the subframe 2. Specifically, as shown in FIG. 11(*b*), the downlink control information is sent at a subframe 3 following the subframe 2. The downlink control information described in the embodiment shown in FIG. 11(*b*) includes a forward scheduling indication. The forward scheduling indication is used by user equipment to determine, according to the forward scheduling indication, that the downlink control information is used to schedule data in a subframe before a subframe in which the downlink control information is located.

In the embodiment shown in FIG. 11, because the signal at least occupies all symbols from the first symbol of the subframe 2 to a last symbol of the subframe 2, utilization of an unlicensed carrier is improved.

In an optional embodiment, the downlink control information described in embodiments shown in FIG. 11(*a*) and FIG. 11(*b*) further includes a radio network temporary identifier RNTI. The RNTI is used by the user equipment to receive the downlink control information according to the RNTI. Optionally, the downlink control information may further include at least one of duration of sending the first signal, a cell identifier of the first carrier, a public land mobile network identifier of the first carrier, or a quantity of symbols occupied by the downlink control information.

For the signal receiving at middle subframes, because subframes subsequent to the first subframe are complete subframes other than a last subframe occupied by the first signal, the base station may send the downlink control information and the data according to the prior art, and the user equipment may receive the downlink control information and the data according to the prior art. The downlink control information may be obtained from the PDCCH or an EPDCCH of the first carrier, or may be obtained from a PDCCH or an E-PDCCH of another carrier.

In this embodiment, because the downlink control information is sent at last N symbols of a subframe (as shown in FIG. 11*a*) or is sent at first N symbols of a subframe (as shown in FIG. 11*b*), when receiving the first signal, the user equipment cannot learn of a specific location of sending the downlink control information in a subframe by the base station. However, for the location of the downlink control information in this embodiment, there are only two cases, that is, the downlink control information is sent at last N symbols of a subframe, or the downlink control information is sent at first N symbols of a subframe. Certainly, the downlink control information can only be sent at last N symbols or first N symbol of a same subframe, but cannot be simultaneously sent at the last N symbols and the first N symbols.

The user equipment performs detection on first N symbols of a subframe. If the downlink control information is detected, the user equipment reads, according to the downlink control information, the scheduled data indicated in the downlink control information. The downlink control information detected in the first N symbols may be used to schedule the data in the subframe in which the downlink control information is located, or may be used to schedule data in a subframe before the subframe in which the downlink control information is located. When the downlink control information is used to schedule the data in the subframe before the subframe in which the downlink control information is located, the user equipment first needs to cache the data in the subframe before the subframe in which the downlink control information is located. If the downlink control information is not detected in the first N symbols, the user equipment detects the downlink control information in last N symbols. Before detecting the downlink control information in the last N symbols, the user equipment needs to cache the data sent by the base station. After detecting the downlink control information in the last N symbols, the user equipment reads, according to the downlink control information, the scheduled data indicated in the downlink control information. Because the user equipment needs to only detect downlink control information in first N symbols or last N symbols of a subframe, compared with detection performed on symbols of a subframe one by one, energy consumption of user equipment may be reduced, and a running speed of the user equipment may be increased.

In the embodiment shown in FIG. 11(a), when receiving the first signal, the user equipment first caches the first signal. Then the user equipment determines, according to the RNTI, the downlink control information corresponding to the user equipment, receives the downlink control information, and reads, according to the downlink control information, the scheduled data indicated in the downlink control information.

For example, if the user equipment detects that downlink control information corresponding to a predetermined RNTI is sent at last N symbols of the subframe 2, and the downlink control information indicates that data in the current subframe occupies N symbols, when receiving the data, the user equipment only receives the data corresponding to N symbols before the symbols occupied by the downlink control information.

If the user equipment detects that downlink control information corresponding to a predetermined RNTI is sent at first several symbols of a current subframe in which the downlink control information is located, and the downlink control information indicates that data in the current subframe occupies N symbols, when receiving the data, the user equipment only receives the data corresponding to N symbols after the symbols occupied by the downlink control information.

Optionally, if the downlink control information indicates that the signal occupies duration of D milliseconds, in subsequent D−1 milliseconds, the user equipment does not detect the downlink control information in the last N symbols of the subframe, but only detects the downlink control information in first several symbols of the subframe.

In the embodiment shown in FIG. 11(b), the user equipment detects downlink control information corresponding to a predetermined RNTI. The downlink control information may be received from a PDCCH of a subframe 3 following a subframe 2 of the signal shown in FIG. 11(b). In an optional embodiment, the downlink control information may also be received from a PDCCH of another licensed carrier or another unlicensed carrier. Then, the user equipment reads data in a first subframe of the first carrier according to the downlink control information.

Optionally, the user equipment may determine, according to symbol information of data indicated in the downlink control information, a quantity of symbols occupied by the data in the subframe 2. Optionally, the UE determines the downlink control information according to a forward scheduling indication in the downlink control information, to schedule data in a subframe before a subframe in which the downlink control information is located.

The embodiments of the present invention and characteristics in the embodiments may be combined with each other if there is no conflict.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data sending method, comprising:
   determining, by a base station, a time-domain interval of available time-frequency resources in an unlicensed spectrum, wherein the available time-frequency resources are continuous time-frequency resources in a time domain; and
   sending, by the base station, downlink control information and data, wherein the data is in a first subframe, the first subframe is an initial subframe in the interval, the downlink control information comprises scheduling indication information, location indication information, and data symbol indication information, the scheduling indication information is used to indicate a frequency-domain location of the data, and the location indication information is used to indicate a time-domain location of the data, the data symbol indication information is used to indicate an end location of the data in the third subframe, the third subframe is a last subframe in the time-domain interval of available time-frequency resources in an unlicensed spectrum.

2. The method according to claim 1, the method further comprises,
   sending, by the base station, the downlink control information by using a secondary cell corresponding to the unlicensed spectrum.

3. The method according to claim 1, the method further comprises,
   the downlink control information further comprises a radio network temporary identifier (RNTI), the RNTI is used by a user equipment to receive the downlink control information according to the RNTI.

4. A base station, comprising:
   a processing unit, configured to determine a time-domain interval of available time-frequency resources in an unlicensed spectrum, wherein the available time-frequency resources are continuous time-frequency resources in a time domain; and
   a sending unit, configured to send downlink control information and data, wherein the data is in a first subframe, the first subframe is an initial subframe in the interval, the downlink control information comprises scheduling indication information, location indication information, and data symbol indication information, the scheduling indication information is used to indicate a frequency-domain location of the data, and the location indication information is used to indicate a time-domain location of the data, the data symbol indication information is used to indicate an end location of the data in the third subframe, the third subframe is a last subframe in the time-domain interval of available time-frequency resources in an unlicensed spectrum.

5. The base station according to claim 4, wherein the sending unit further configured to send the downlink control information by using a secondary cell corresponding to the unlicensed spectrum.

6. The base station according to claim 4, the method further comprises,
the downlink control information further comprises a radio network temporary identifier (RNTI), the RNTI is used by a user equipment to receive the downlink control information according to the RNTI.

7. A data receiving method, comprising:
performing, by user equipment, detection on a downlink control channel to obtain downlink control information, wherein the downlink control information comprises scheduling indication information and location indication information, and the scheduling indication information is used to indicate a frequency-domain location of scheduled data in a first subframe;
determining, by the user equipment, a time-domain location of the data in the first subframe according to location indication information in the downlink control information or a preamble signal received in an unlicensed spectrum before the downlink control channel, wherein the location indication information is used to indicate the time-domain location of the data in the first subframe; and
receiving, by the user equipment, the data in the unlicensed spectrum according to the frequency-domain location and the time-domain location of the data.

8. The method according to claim 7, wherein the downlink control information comprises data symbol indication information, the method further comprises:
determining, by the user equipment, an end location of the data in the first subframe according to the data symbol indication information.

9. The method according to claim 7, wherein the first subframe is a last subframe in the time-domain interval of available time-frequency resources in an unlicensed spectrum.

10. The method according to claim 7, the method further comprises:
receiving, by the user equipment, the downlink control information by using a secondary cell corresponding to the unlicensed spectrum.

11. The method according to claim 7, the method further comprises:
the downlink control information further comprises a radio network temporary identifier (RNTI), the RNTI is used by the user equipment to receive the downlink control information according to the RNTI.

12. User equipment, comprising:
a processor, configured to perform detection on a downlink control channel to obtain downlink control information, wherein the downlink control information comprises scheduling indication information and location indication information, and the scheduling indication information is used to indicate a frequency-domain location of scheduled data in a first subframe, wherein
the processor is further configured to determine a time-domain location of the data in the first subframe according to location indication information in the downlink control information or a preamble signal received in an unlicensed spectrum before the downlink control channel, wherein the location indication information is used to indicate the time-domain location of the data in the first subframe; and
a receiving unit, configured to receive the data in the unlicensed spectrum according to the frequency-domain location and the time-domain location of the data.

13. The user equipment according to claim 12, wherein the downlink control information comprises data symbol indication information,
the processor is further configured to determine an end location of the data in the first subframe according to the data symbol indication information.

14. The user equipment according to claim 12, wherein the first subframe is a last subframe in the time-domain interval of available time-frequency resources in an unlicensed spectrum.

15. The user equipment according to claim 12, the method further comprises:
the receiving unit, further configured to receive the downlink control information by using a secondary cell corresponding to the unlicensed spectrum.

16. The user equipment according to claim 12, the method further comprises:
the downlink control information further comprises a radio network temporary identifier (RNTI), the RNTI is used by the user equipment to receive the downlink control information according to the RNTI.

* * * * *

UNITED STATES PATENT AND TRADEMARK OFFICE
CERTIFICATE OF CORRECTION

PATENT NO. : 10,182,436 B2
APPLICATION NO. : 15/587477
DATED : January 15, 2019
INVENTOR(S) : Li et al.

It is certified that error appears in the above-identified patent and that said Letters Patent is hereby corrected as shown below:

In the Specification

In Column 34, Line 17, delete "at at least" and insert -- at least --, therefor.

Signed and Sealed this
Thirteenth Day of September, 2022

Katherine Kelly Vidal
*Director of the United States Patent and Trademark Office*